US011243294B2

(12) United States Patent
Galera et al.

(10) Patent No.: US 11,243,294 B2
(45) Date of Patent: Feb. 8, 2022

(54) WAVEFORM RECONSTRUCTION IN A TIME-OF-FLIGHT SENSOR

(71) Applicant: Rockwell Automation Technologies, Inc., Mayfield Heights, OH (US)

(72) Inventors: Richard Galera, Nashua, NH (US); Anne E. Bowlby, Milwaukee, WI (US); Derek W. Jones, Galloway (GB); Nilesh Pradhan, Milwaukee, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 1183 days.

(21) Appl. No.: 15/704,606

(22) Filed: Sep. 14, 2017

(65) Prior Publication Data

US 2018/0003807 A1 Jan. 4, 2018

Related U.S. Application Data

(63) Continuation-in-part of application No. 14/609,340, filed on Jan. 29, 2015, now Pat. No. 9,921,300.
(Continued)

(51) Int. Cl.
*G01C 3/08* (2006.01)
*G01S 7/48* (2006.01)
(Continued)

(52) U.S. Cl.
CPC .......... *G01S 7/4802* (2013.01); *G01S 7/4863* (2013.01); *G01S 7/4865* (2013.01); *G01S 17/10* (2013.01); *G01S 17/894* (2020.01)

(58) Field of Classification Search
CPC .... G01S 7/4802; G01S 17/894; G01S 7/4865; G01S 7/4863; G01S 17/10
See application file for complete search history.

(56) References Cited

U.S. PATENT DOCUMENTS 4,967,317 A 10/1990 Plumly
5,029,008 A 7/1991 Ferren
(Continued)

FOREIGN PATENT DOCUMENTS

CN 1437063 8/2003
CN 101114021 1/2008
(Continued)

OTHER PUBLICATIONS

Office Action for Chinese application No. 201510257326.7, dated Sep. 5, 2017.
(Continued)

*Primary Examiner* — Samantha K Nickerson
(74) *Attorney, Agent, or Firm* — Amin, Turocy & Watson, LLP

(57) ABSTRACT

A time-of-flight (TOF) sensor device is configured to perform classification analytics on a waveform signal representing a reflected light pulse, and to classify an object from which the light pulse was received based on characteristic properties of the reflected pulse. The TOF sensor device can compare the reflected pulse waveform with stored characteristic waveform profiles indicative of different types of objects or atmospheric particulates, including but not limited to snow, aerosol, water, fog, or mist. Some embodiments of TOF sensor device can also detect excessive levels of mist or suspended particulates that may reduce the detection accuracy of the sensor. To this end, such embodiments project focused light beams according to a defined pattern, and compare the reflected pattern with the defined pattern to determine a degree of pattern distortion attributable to the presence of mist.

20 Claims, 22 Drawing Sheets

Related U.S. Application Data

(60) Provisional application No. 62/000,486, filed on May 19, 2014.

(51) Int. Cl.
*G01S 7/4863* (2020.01)
*G01S 17/10* (2020.01)
*G01S 7/4865* (2020.01)
*G01S 17/894* (2020.01)

(56) References Cited

U.S. PATENT DOCUMENTS

| | | |
|---|---|---|
| 5,075,823 A | 12/1991 | Chomyn |
| 6,235,148 B1 | 5/2001 | Courson et al. |
| 6,517,213 B1 | 2/2003 | Fujita et al. |
| 6,526,361 B1* | 2/2003 | Jones .................. G01R 31/385 702/63 |
| 7,255,691 B2 | 8/2007 | Tolkoff et al. |
| 7,355,179 B1 | 4/2008 | Wood et al. |
| 7,796,820 B2 | 9/2010 | Simon et al. |
| 8,224,032 B2 | 7/2012 | Fuchs et al. |
| 8,253,792 B2 | 8/2012 | Wells et al. |
| 8,340,402 B2* | 12/2012 | Schmitt ............... H04N 13/271 382/154 |
| 8,421,037 B2 | 4/2013 | Leard |
| 8,480,246 B2 | 7/2013 | Leard |
| 8,531,308 B2 | 9/2013 | Dickie et al. |
| 8,976,340 B2* | 3/2015 | Gilliland ................ G01S 17/88 356/5.01 |
| 9,234,618 B1* | 1/2016 | Zhu ........................ G01S 7/497 |
| 9,251,598 B2 | 2/2016 | Wells et al. |
| 2002/0061134 A1 | 5/2002 | Cofer et al. |
| 2002/0186299 A1 | 12/2002 | Cofer |
| 2004/0041984 A1 | 3/2004 | Tani et al. |
| 2004/0095996 A1 | 5/2004 | Mossakowski |
| 2004/0150991 A1 | 8/2004 | Ouderkirk et al. |
| 2004/0150997 A1 | 8/2004 | Ouderkirk et al. |
| 2004/0233416 A1 | 11/2004 | Doemens et al. |
| 2005/0207618 A1 | 9/2005 | Wohler et al. |
| 2006/0227317 A1 | 10/2006 | Henderson et al. |
| 2007/0217670 A1 | 9/2007 | Bar-Am |
| 2008/0007709 A1 | 1/2008 | Bamji et al. |
| 2008/0013821 A1 | 1/2008 | Macgregor et al. |
| 2008/0144000 A1 | 6/2008 | Thun et al. |
| 2008/0302951 A1 | 12/2008 | Aoki et al. |
| 2009/0079841 A1 | 3/2009 | Leard et al. |
| 2009/0129115 A1 | 5/2009 | Fine et al. |
| 2009/0245651 A1 | 10/2009 | Friedhoff et al. |
| 2009/0257241 A1 | 10/2009 | Meinke et al. |
| 2010/0128109 A1 | 5/2010 | Banks |
| 2010/0136302 A1 | 6/2010 | Comanzo et al. |
| 2010/0207762 A1 | 8/2010 | Lee et al. |
| 2011/0050878 A1 | 3/2011 | Wells et al. |
| 2011/0051119 A1 | 3/2011 | Min et al. |
| 2011/0109617 A1 | 5/2011 | Snook et al. |
| 2011/0241862 A1* | 10/2011 | Debouk ............. B60W 50/035 340/439 |
| 2012/0106791 A1 | 5/2012 | Lim |
| 2012/0146789 A1 | 6/2012 | De Luca et al. |
| 2012/0146792 A1 | 6/2012 | De Luca et al. |
| 2012/0293625 A1 | 11/2012 | Schneider et al. |
| 2012/0294536 A1 | 11/2012 | Neuman et al. |
| 2012/0330447 A1 | 12/2012 | Gerlach et al. |
| 2013/0038882 A1 | 2/2013 | Umeda et al. |
| 2013/0044310 A1 | 2/2013 | Mimeault |
| 2013/0057668 A1* | 3/2013 | Kim ...................... A61B 5/18 348/77 |
| 2013/0094705 A1 | 4/2013 | Tyagi et al. |
| 2013/0155723 A1 | 6/2013 | Coleman |
| 2013/0182114 A1 | 7/2013 | Zhang et al. |
| 2013/0194776 A1 | 8/2013 | Santos et al. |
| 2013/0300835 A1 | 11/2013 | Kinoshita et al. |
| 2014/0055771 A1 | 2/2014 | Oggier |
| 2014/0294245 A1 | 10/2014 | Siilats |
| 2015/0043787 A1 | 2/2015 | Fredrich et al. |

FOREIGN PATENT DOCUMENTS

| | | |
|---|---|---|
| CN | 101995652 A | 3/2011 |
| CN | 102447882 | 5/2012 |
| CN | 103181156 | 6/2013 |
| DE | 102006048166 | 2/2008 |
| DE | 102012021375 | 5/2013 |
| EP | 0835460 | 4/1998 |
| EP | 2642429 | 9/2013 |
| GB | 2319426 | 5/1998 |
| KR | 20130008469 | 1/2013 |
| WO | 2008152647 | 12/2008 |
| WO | 2013135608 | 9/2013 |

OTHER PUBLICATIONS

Extended European Search Report for EP Application Serial No. 15168237.4, dated Nov. 12, 2015, 8 pages.
Office Action dated Dec. 17, 2015 for U.S. Appl. No. 14/509,466, 25 pages.
Notice of Allowance for U.S. Appl. No. 14/553,431, dated Oct. 8, 2015, 25 pages.
Extended European Search Report for EP Application Serial No. 15168239.0, dated Oct. 5, 2015, 10 pages.
Extended European Search Report for EP Application Serial No. 15168119.4, dated Oct. 26, 2015, 9 pages.
Extended European Search Report for EP Application Serial No. 15168241.6, dated Mar. 7, 2016, 8 pages.
European Office Action for EP Application Serial No. 15168237.4, dated Dec. 21, 2015, 2 pages.
European Office Action for EP Application Serial No. 15168239.0, dated Nov. 30, 2015, 2 pages.
European Office Action for EP Application Serial No. 15168119.4, dated Nov. 30, 2015, 2 pages.
Final Office Action for U.S. Appl. No. 14/509,466 dated Apr. 8, 2016, 20 pages.
Notice of Allowance for U.S. Appl. No. 14/943,246, dated Jun. 29, 2016, 42 pages.
Office Action for U.S. Appl. No. 14/509,466, dated Jul. 29, 2016, 21 pages.
Chinese Office Action and English Translation for CN Patent Application Serial No. 201510256225.8, dated Aug. 19, 2016, 19 pages.
Office Action for U.S. Appl. No. 14/525,125, dated Oct. 21, 2016, 76 pages.
Office Action for U.S. Appl. No. 14/553,363, dated Nov. 4, 2016, 33 pages.
Notice of Allowance for U.S. Appl. No. 14/509,466, dated Dec. 13, 2016, 34 pages.
Office Action for U.S. Appl. No. 14/525,125, dated Feb. 16, 2017, 105 pages.
Notice of Allowance for U.S. Appl. No. 14/553,363, dated Feb. 28, 2017, 20 pages.
European office Action for Application Serial No. 15/168,119.4 dated Apr. 26, 2017, 9 pages.
Dickens et al., "Pedestrian Detection For Underground Mine Vehicles Using Thermal Images", AFRICON, 2011, IEEE, Sep. 13, 2011 (Sep. 13, 2011), pp. 1-6, XP031990097, DOI: 10.1109/AFRCON. 2011.6072167, ISBN: 978-1-61284-992-8.
Chinese Office Action for Application Serial No. 201510256019.7, dated Feb. 27, 2017, 12 pages.
Non-Final Office Action for U.S. Appl. No. 14/525,125 dated Jun. 30, 2017, 63 pages.
Non-Final Office Action for U.S. Appl. No. 14/609,340 dated Jul. 21, 2017, 51 pages.
Final Office Action for U.S. Appl. No. 14/525,125 dated Dec. 21, 2017, 62 pages.

* cited by examiner

WAVEFORM RECONSTRUCTION IN A TIME-OF-FLIGHT SENSOR

CROSS-REFERENCE TO RELATED APPLICATIONS

This application is a continuation-in-part of U.S. patent application Ser. No. 14/609,340, filed on Jan. 29, 2015, and entitled "WAVEFORM RECONSTRUCTION IN A TIME-OF-FLIGHT SENSOR," which claims priority to U.S. Provisional Application Ser. No. 62/000,486, filed on May 19, 2014. The entireties of these related applications are incorporated herein by reference.

BACKGROUND

The subject matter disclosed herein relates generally to time-of-flight (TOF) sensors, more particularly, to a TOF sensor capable of accurately reconstructing a waveform for a reflected light pulse using a relatively low sampling rate for the purpose of object distance measurement and additional waveform analysis

BRIEF DESCRIPTION

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

In one or more embodiments, an imaging device is provided comprising an illumination component configured to emit a light pulse toward a viewing field; a photo-receiver configured to generate an electrical output proportional to an intensity of light incident on a surface of the photo-receiver; a pixel array component configured to generate waveform data corresponding to a reflected light pulse received by the photo-receiver based on the electrical output; a waveform analysis component configured to perform a comparison of the waveform data with signature profile data that defines characteristic waveform signatures corresponding to respective object classifications, and generate classification data assigning an object classification, of the object classifications, to an object corresponding to the reflected light pulse based on a result of the analysis; and a hazard analysis and decision component configured to generate an output signal based on the object classification.

Also, one or more embodiments provide a method, comprising emitting, by a time-of-flight (TOF) sensor device comprising a processor, a light pulse into a viewing space; generating, by the TOF sensor device, an electrical output in proportion to an intensity of light incident on a surface of a photo-receiver of the TOF sensor device; generating, by the TOF sensor device, waveform data representing a reflected light pulse received by the photo-receiver based on the electrical output; comparing, by the TOF sensor device, the waveform data with stored waveform profiles that define characteristic waveform signatures for respective object classifications; generating, by the TOF sensor device based on a result of the comparing, classification data that indicates an object classification, of the respective object classifications, assigned to an object corresponding to the reflected light pulse; and in response to determining that the object classification satisfies a criterion, generating, by the TOF sensor device, an output signal based on the object classification.

Also, according to one or more embodiments, a non-transitory computer-readable medium is provided having stored thereon instructions that, in response to execution, cause a TOF sensor device to perform operations, the operations comprising, emitting a light pulse into a viewing area; generating an electrical output proportional to an intensity of light incident on a surface of a photo-receiver of the TOF sensor device; generating, based on the electrical output, waveform data corresponding to a reflected light pulse received by the photo-receiver; comparing the waveform data with waveform profile data that defines characteristic waveform signatures corresponding to respective object classifications; generating based on a result of the comparing, classification data that identifies an object classification, of the respective object classifications, assigned to an object corresponding to the reflected light pulse; and in response to determining that the object classification satisfies a criterion, generating an output signal based on the object classification.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Figure 1B:
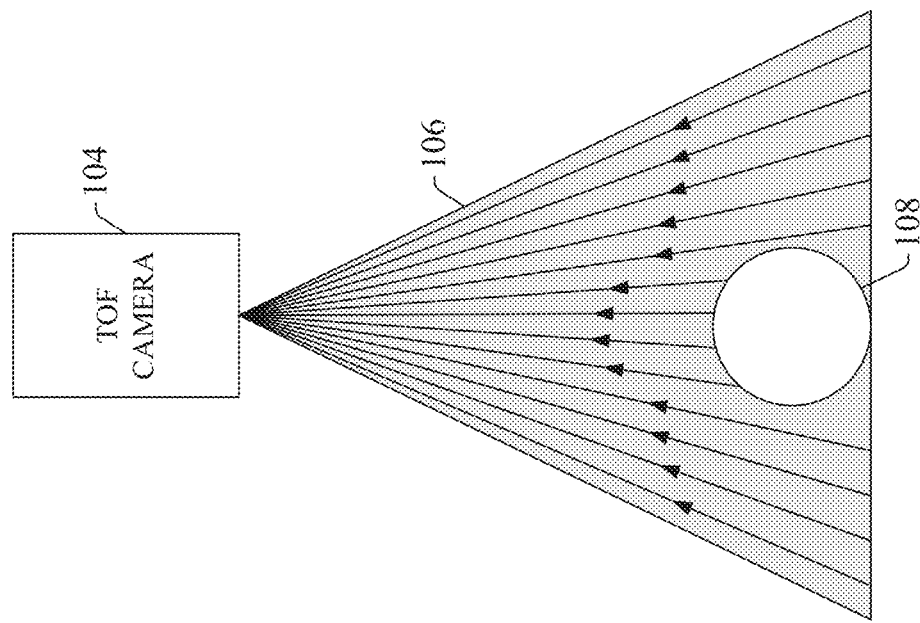
FIGS. 1A and 1B are schematic illustrating general operation of a time-of-flight (TOF) camera.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

Figure 1A:
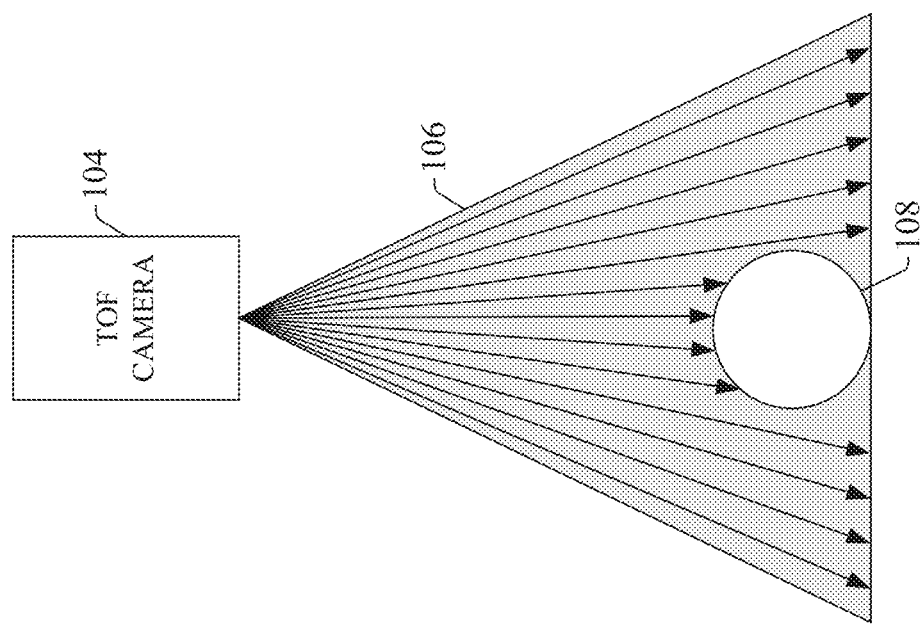

Time-of flight (TOF) cameras use optical techniques to generate distance information for objects and surfaces within the camera's viewing field. FIGS. 1A and 1B illustrate an example TOF camera 104 measuring distance information for an object 108. TOF camera 104 illuminates a viewing field or scene by emitting a beam 106 of light pulses, as shown in FIG. 1A. Objects and surfaces within the scene, including object 108, reflect light pulses back to the receiving element of TOF camera 104, as shown in FIG. 1B. The TOF camera 104 then analyzes the reflected light pulses by measuring the time difference between transmission of a light pulse and receipt of a reflected light pulse for each pixel of the scene. Since light speed is a constant in a given medium, the time delay between transmission of a light pulse and arrival of a corresponding reflected pulse for a given pixel is a function of the distance of a surface point corresponding to that pixel, the distance of an object at an area of the scene corresponding to the pixel can be determined. Collectively, the distance information obtained for all pixels of the scene yields depth map data for the scene.

The reflected light pulses are collected on an array of sensors or photo-receivers within the camera to obtain spatial information. A variety of photo-receivers are available for use, varying based on geometry, types of material used, construction, sensitivity profile, and other parameters. When reflected light pulses are incident on the photo-receivers, the incident light is converted into an electrical output proportional to the intensity of the incident light. The camera then recovers and analyzes the electrical output. To ensure accurate distance measurement using light pulse time delay estimation, a near perfect recovery and representation of the reflected light pulse is vital. In some TOF cameras, the electrical output generated by a photo-receiver is converted into a train of digital samples, and the resulting signal train is analyzed in the digital domain. For accurate distance measurement, a high sampling frequency is required to convert the electrical output from the photo-receiver into digital values. For periodic signals—such as those obtained from reflected illumination pulses—a lower sampling rate could be used. Waveform recovery methods that introduce time delays for sampling and interleaving samples to reconstruct the waveform can be employed; however, these methods require photo-receivers that support a relatively high bandwidth. Moreover, many available technologies (e.g., photo-receivers, readout circuits for CMOS photo diodes, analog-to-digital converters, etc.) are not conducive to high-speed sampling.

To address these and other issues, one or more embodiments of the present disclosure provide a TOF sensor capable of attaining accurate distance measurement using a relatively low sampling rate. To this end, components of the TOF sensor obtain a number of samples for a received light pulse incident on a given photo-receiver by emitting a train of light pulses to the viewing field and integrating the electrical output generated by the photo receiver over each integration period and summing those values to yield an accumulation value. The sensor repeats this process for multiple accumulation cycles; however, for each consecutive accumulation cycle the start of the integration period is delayed relative to the start time of the integration period for the previous cycle by a delay period (the sampling rate). The delay period may be a function of the desired number of samples, and/or the distance of an object being measured by the TOF sensor. Sampled values for the waveform are obtained by determining the difference values between consecutive accumulation values for the respective accumulation cycles.

Figure 2:
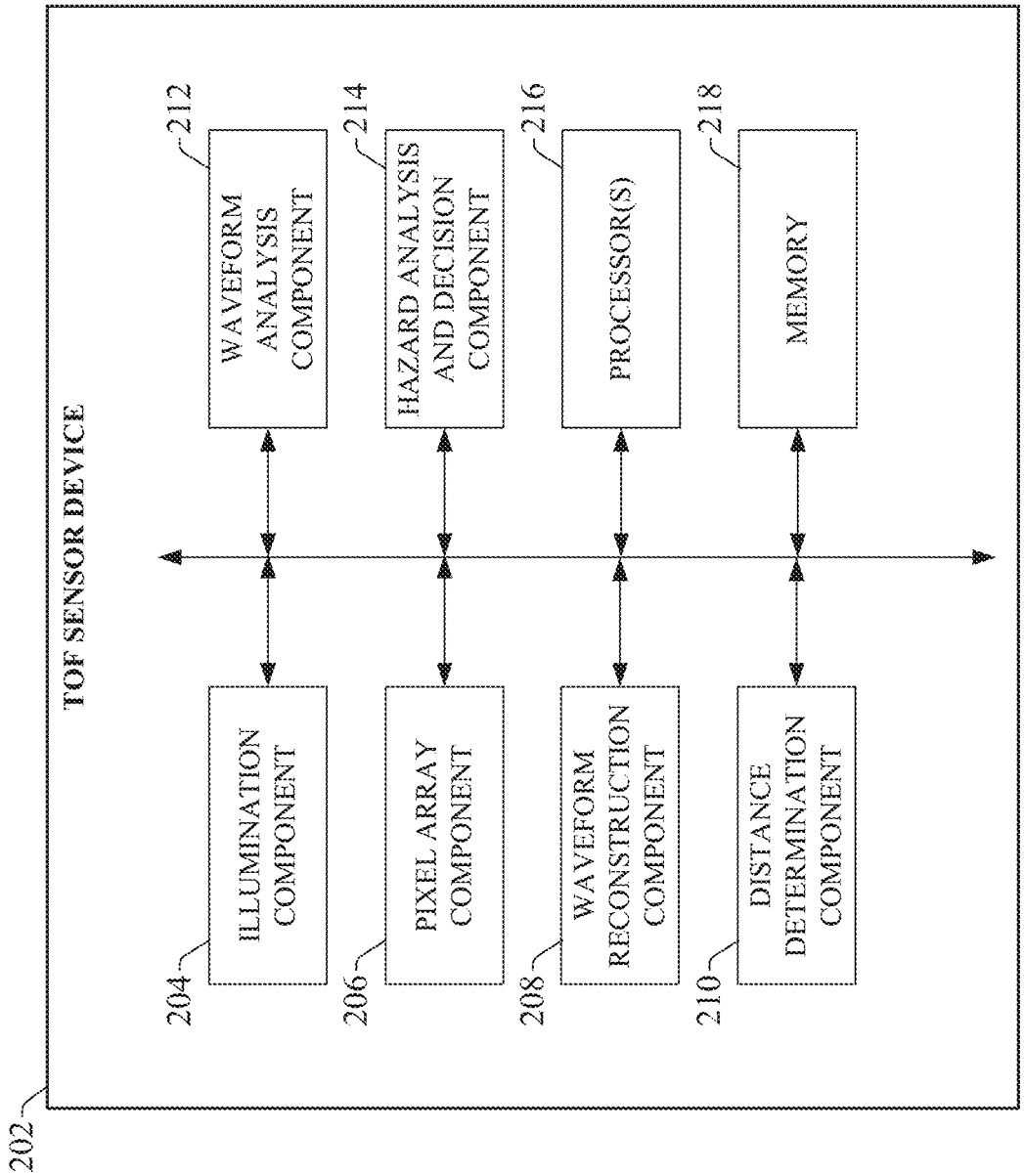
FIG. 2 is a block diagram of an example TOF sensor device.

FIG. 2 is a block diagram of an example TOF sensor device 202 according to one or more embodiments of this disclosure. Although FIG. 2 depicts certain functional components as residing on TOF sensor device 202, it is to be appreciated that one or more of the functional components illustrated in FIG. 2 may reside on a separate device relative to TOF sensor device 202 in some embodiments. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

TOF sensor device 202 can include an illumination component 204, a pixel array component 206, a waveform reconstruction component 208, a distance determination component 210, a waveform analysis component 212, a hazard analysis and decision component 214, one or more processors 216, and memory 218. In various embodiments, one or more of the illumination component 204, pixel array component 206, waveform reconstruction component 208, distance determination component 210, waveform analysis component 212, hazard analysis and decision component 214, the one or more processors 216, and memory 218 can be electrically and/or communicatively coupled to one another to perform one or more of the functions of the TOF sensor device 202. In some embodiments, components 204, 206, 208, 210, 212, and 214 can comprise software instructions stored on memory 218 and executed by processor(s) 216. TOF sensor device 202 may also interact with other hardware and/or software components not depicted in FIG. 2. For example, processor(s) 216 may interact with one or more external user interface devices, such as a keyboard, a mouse, a display monitor, a touchscreen, another sensor, a network, a safety device, or other such interface devices.

Illumination component 204 can be configured to control emission of light by the sensor device. TOF sensor device 202 may comprise a laser, light emitting diode (LED), remote phosphor, or other type of light source under the control of illumination component 204. In particular, illumination component 204 emits periodic light pulses directed to the viewing field, so that time-of-flight information can be generated by the TOF sensor device 202 based on the reflected light pulses returned to the sensor's photo-receiver array. The pixel array component 206 can be configured to scan the pixels of the TOF sensor device's photo-receiver array and generate pixel array data based on measurement of the electrical outputs generated by the photo-receivers in response to receipt of reflected light pulses from the viewing field. The waveform reconstruction component 208 can be configured to, for each pixel of the pixel array, generate a waveform corresponding to a reflected light pulse received at the photo-receiver corresponding to that pixel. Distance determination component 210 can be configured to derive distance information for each pixel based on the waveforms constructed by the waveform reconstruction component 208, and generate a depth map for the viewing area based on the distance information.

The waveform analysis component 212 can be configured to analyze the reconstructed waveform signal to, for example, identify specific waveform patterns or filter specific pulses considered not relevant for the depth map data. The hazard analysis and decision component 214 can be configured to control one or more sensor outputs based on results generated by the distance determination component 210 and the waveform analysis component 212. This can include, for example, sending a control signal to an industrial device or controller to perform a control action, initiating a safety action (e.g., removing power from a hazardous machine, switching an industrial system to a safe operating mode, etc.), sending a feedback message to a display device (e.g., a human-machine interface, a personal mobile device, etc.), sending depth map data to an on-board computer in a mobile vehicle, or other such output.

The one or more processors 216 can perform one or more of the functions described herein with reference to the systems and/or methods disclosed. Memory 218 can be a computer-readable storage medium storing computer-executable instructions and/or information for performing the functions described herein with reference to the systems and/or methods disclosed.

Figure 3:
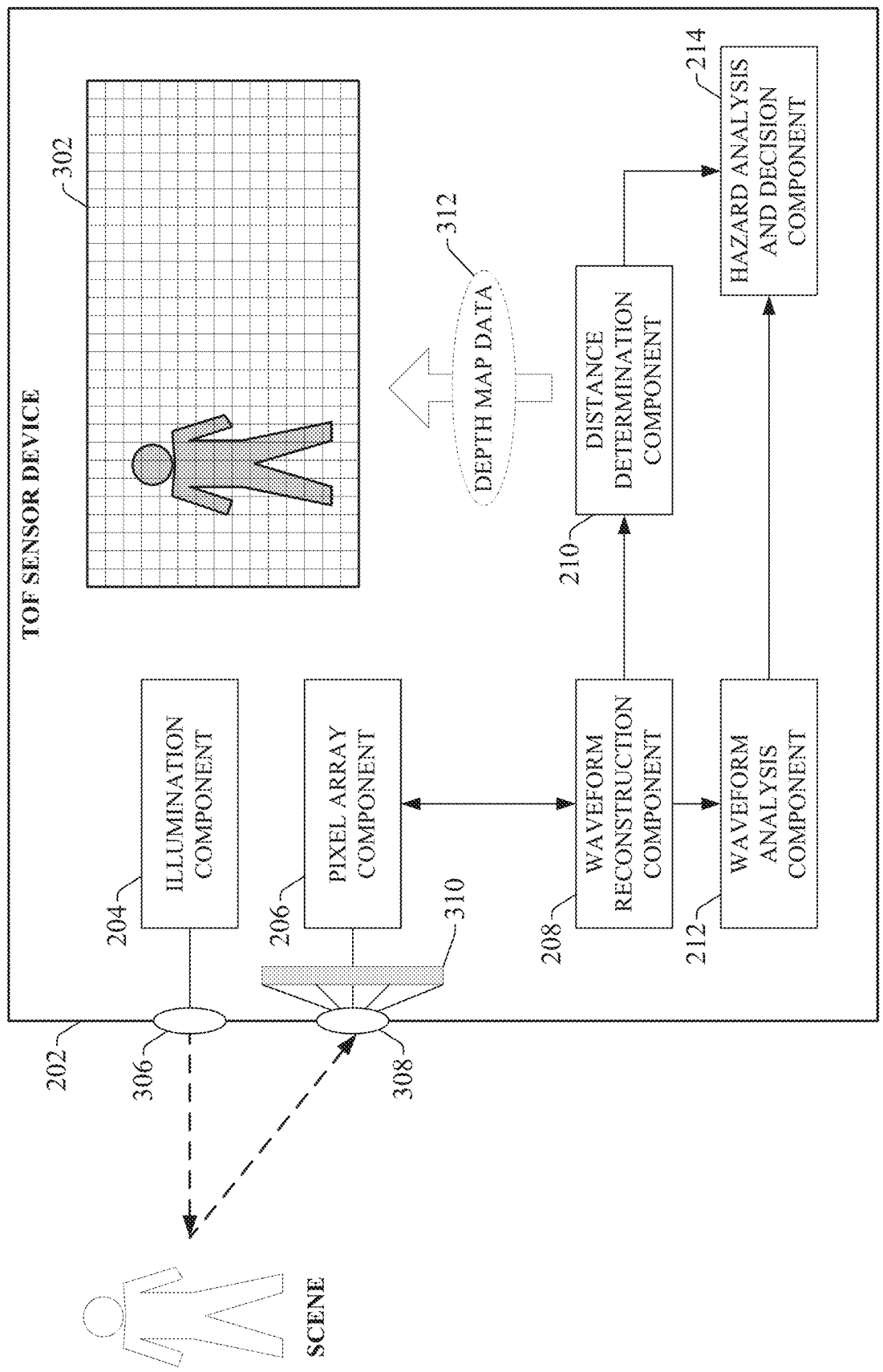
FIG. 3 is a block diagram illustrating components of the TOF sensor device.

FIG. 3 is a block diagram illustrating components of the TOF sensor device 202 according to one or more embodiments. In this example, illumination component 204 controls emission of LED, laser light, or remote phosphor pulses to the viewing field via lens element 306. For example, illumination component 204 may project a wide beam of light pulses (e.g., a cone-shaped beam) over the viewing field (e.g., a cone-shaped beam). Receiver lens element 308 receives light pulses reflected from the viewing field and directs the reflected light pulses to a photo-receiver array 310, which generates respective electrical outputs for each pixel of the array as a function of the intensity of the light pulse received at each photo-receiver. Pixel array component 206 performs a readout of the photo-receiver array 310 at regular intervals to obtain samples of the voltage output data for each pixel for analysis.

The sampled information is provided to waveform reconstruction component 208, which reconstitutes the waveforms corresponding to the reflected light pulses received at the photo-receiver array 310 using techniques described in more detail below. Based on the waveform data generated by waveform reconstruction component 208, distance determination component 210 can determine a distance value associated with each pixel, and additional analysis can be conducted by waveform analysis component 212. The distance value represents the distance of the object or surface corresponding to the pixel from the TOF sensor device, and can be determined by identifying the front edge of the returned light pulse from the waveform data, which represents the time at which the light pulse was received at the receiver lens element 308. The distance determination component 210 can then compare this time with the time at which the emitted light pulse was sent by the illumination component 204. The difference between the two times represents the time-of-flight for the pulse, from which the distance information for the pixel can be derived. By performing waveform reconstruction and distance determination for each pixel in the pixel array, the TOF sensor can generate depth map data 312, which can be used to create a 3D point cloud 302 of the viewing field. Based on the particular application being executed by the TOF sensor device 202, hazard analysis and decision component 214 can be instructed to generate a suitable control or message output based on the depth map data and additional waveform analysis.

Figure 4:
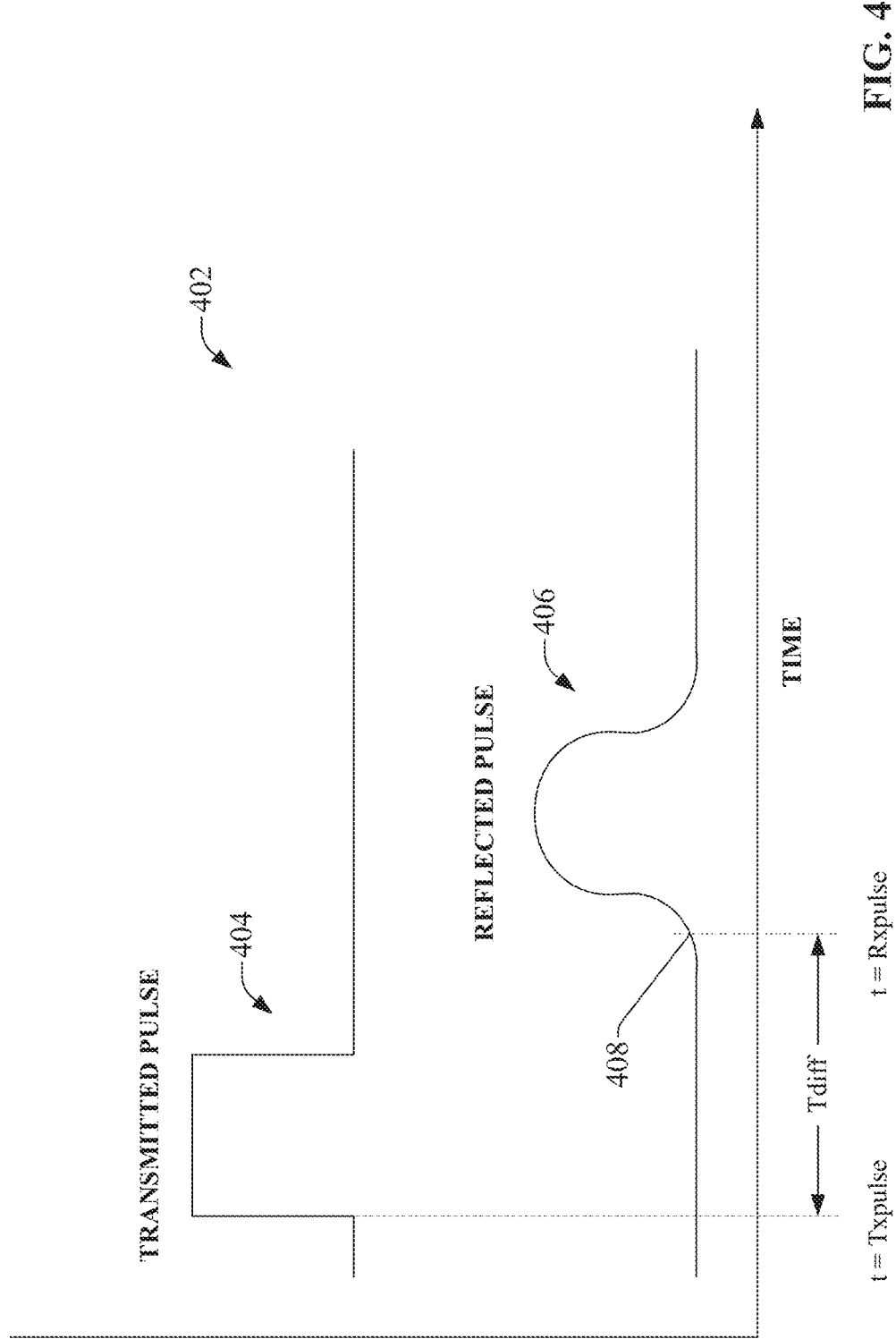
FIG. 4 is a graph that plots a representation of a transmitted light pulse sent by a TOF sensor and a corresponding reflected light pulse subsequently received at the photo-receiver of the TOF sensor.

Techniques implemented by the waveform reconstruction component 208 and distance determination component 210 for reconstructing the reflected light pulse waveforms are now described. FIG. 4 is a timing chart 402 that plots a representation of a transmitted light pulse 404 sent by the TOF sensor device's lens element 306 and a waveform for a corresponding reflected light pulse 406 subsequently received at the photo-receiver. The difference Tdiff between the time Txpulse at which light pulse 404 begins emission and time Rxpulse when the reflected light pulse 406 begins arriving at the photo-receiver is proportional to the distance (from the TOF sensor) of a surface from which the transmitted light pulse 404 was reflected. Since the transmitted light pulse 404 is generated within the TOF sensor device itself, the start and stop times for the transmitted pulse can be accurately measured by the sensor's internal components, yielding a substantially square wave having a length corresponding to the duration of the transmitted pulse. The waveform for the reflected light pulse 406 is determined by sampling the photo-receiver at which the return pulse is received, and applying curve-fitting on the sampled values to yield the waveform.

Figure 5:
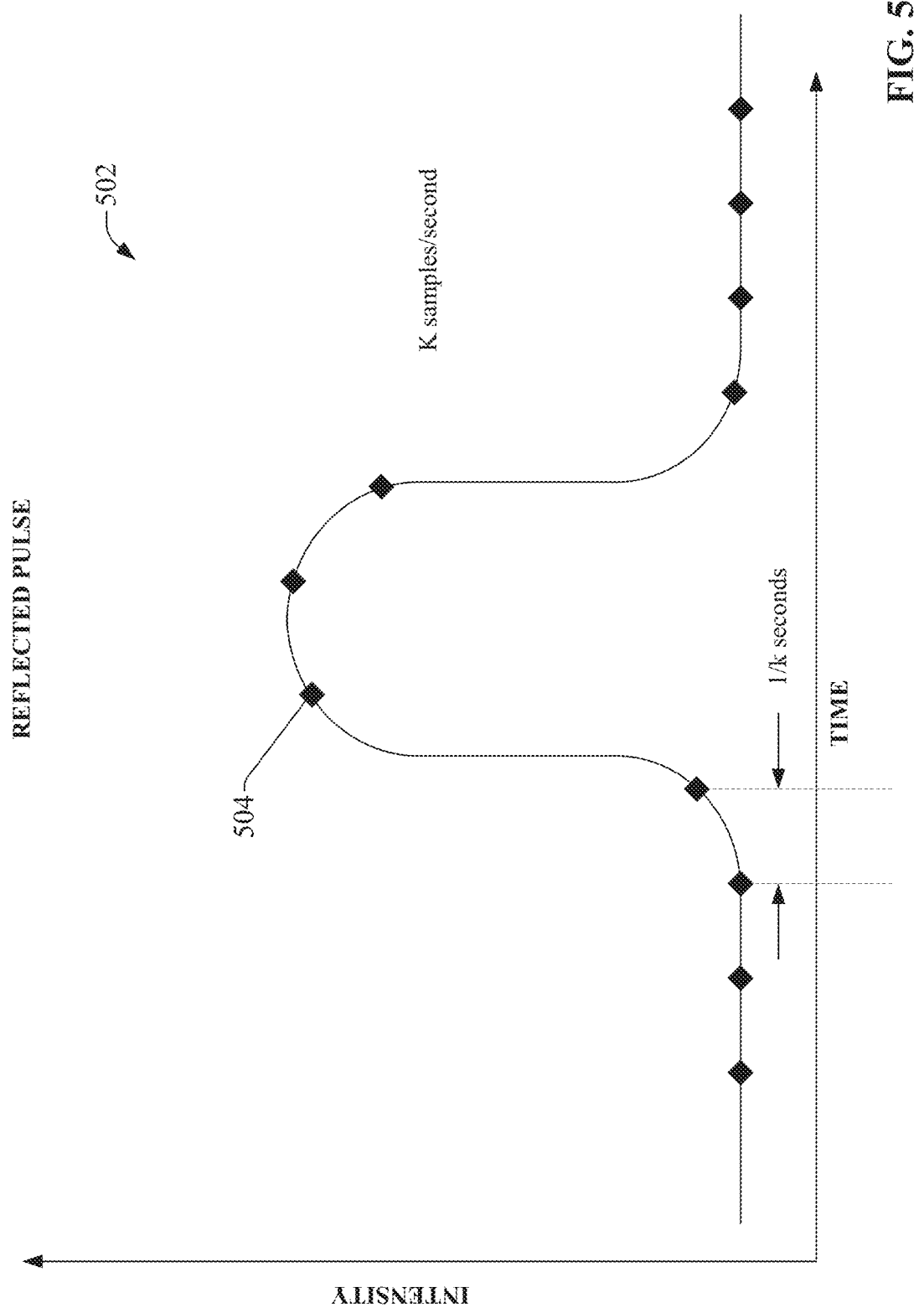
FIG. 5 is a graph illustrating a representation of the reflected light pulse sampled at a high rate of sampling.

FIG. 5 is a graph 502 illustrating a representation of the reflected light pulse 406 sampled at k samples/second (where k is an integer) to yield a number of sampled points 504 spaced apart in time by 1/k seconds. In this example, k samples/second represents a desired sampling rate that ensures accurate reconstitution of the reflected light pulse waveform. Using certain types of photo-receivers, such a sampling rate may not be conductive to achieving accurate signal-to-noise ratio (SNR). One or more embodiments of the TOF sensor device described herein employ waveform reconstruction techniques capable of reconstructing the waveform at the desired sample rate of k samples/second. The TOF sensor achieves this by executing a number of accumulation cycles during which the electrical output of the photo-receivers in response to incident light is read and integrated over controlled exposure times, referred to herein as integration periods, to yield accumulated values.

Figure 6:
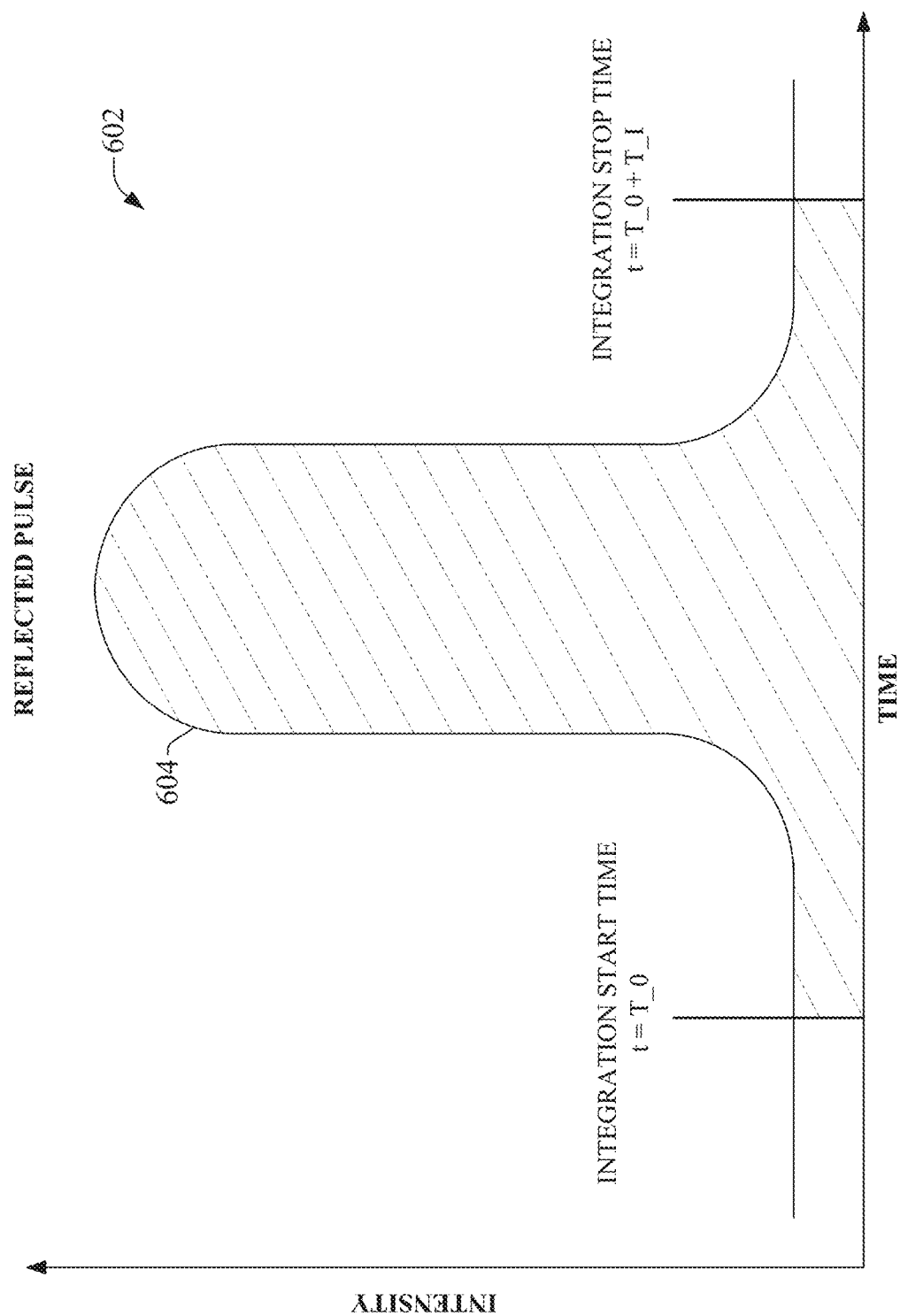
FIG. 6 is a graph plotting a waveform for a reflected pulse, with the area below the curve of the waveform representing the accumulation value over an integration period.

FIG. 6 illustrates a graph 602 of a waveform 604 representing the electrical output of a photo-receiver over time during an example integration period. The electrical output is a function of the intensity of light incident on the surface of the photo-receiver. The integration period begins at t=T_0 and has a duration of T_I seconds, for a total integration duration of T_I seconds. In this example, the entirety of a reflected light pulse was received at the photo-receiver during the integration period, such that the peak, rising edge, and falling edge of the waveform 604 fall within the integration period (as will be explained in more detail below, this will not be the case for all accumulation cycles, since the integration window is shifted for each accumulation cycle). The area 606 below the curve of the waveform 604 is marked with dashed lines, and represents the sum of all the electrical output generated by the photo-receiver in response to incident light between t=T_0 and (T_0+T_I). By integrating the incident light energy measured over this integration time period, the value of the electrical output obtained from the photo-receiver will be obtained as a sum of all the electrical output generated by the photo-receiver during the integration period.

According to the general methodology utilized by one or more embodiments of the TOF sensor described herein, the waveform reconstruction component 208 executes a number of accumulation cycles. For multiple integration cycles of each accumulation cycle, the electrical output of the photo-receivers in response to incident light is read and integrated over the integration period, and the integration results for the multiple integration cycles are added together to yield accumulated values. For each accumulation cycle, the start time of the integration period is delayed by a delay period relative to the start time of the integration period for the previous accumulation cycle, exposing the photo-receiver to a different portion of the reflected light pulse waveform relative to the previous accumulation cycle. The differences between pairs of consecutive accumulation values are then obtained to yield a set of time-based sampled values for the reflected waveform, which can be used to accurately reconstruct the reflected waveform (e.g. by interpolating between the sampled values).

Figure 7:
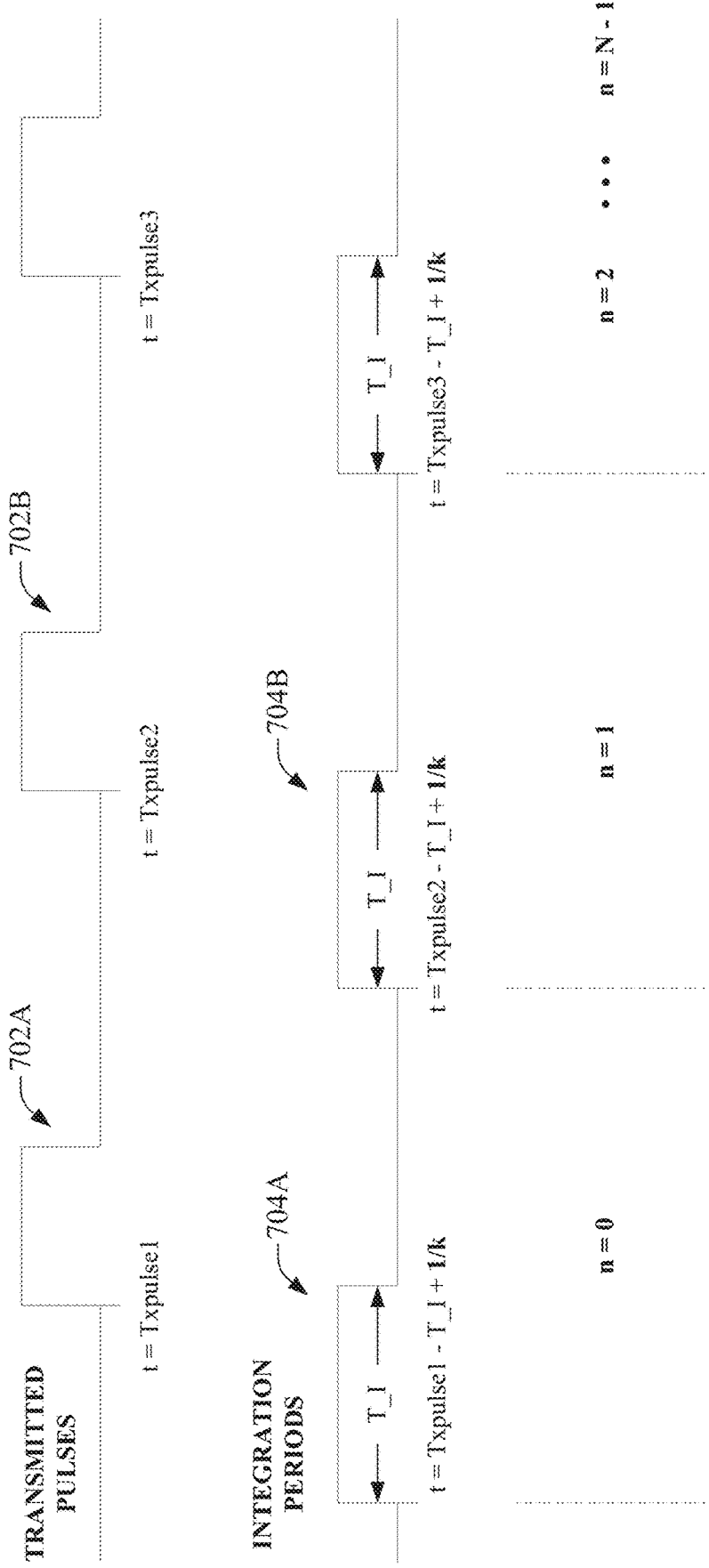
FIG. 7 is a timing chart illustrating relative timings of an emitted pulse, a reflected pulse, and integration periods for a first accumulation.

This technique is now described in more detail. FIG. 7 is a timing diagram for a portion of first accumulation cycle (Accumulation Cycle #1). Per normal operation of the TOF sensor, the illumination component 204 of the TOF sensor emits a train of transmitted light pulses 702 toward a viewing field. The light pulses are transmitted within a rate P (pulses per second). The accumulation cycle comprises N integration cycles or accumulations, with each integration cycle corresponding to one of the transmitted light pulses 702. For a first integration cycle n=0, the waveform reconstruction component 208 initiates a first integration period 704A, where the start time of the integration period is a function of the start time of the first transmitted pulse 702A. For example, if the first transmitted pulse 702A begins at time t=Txpulse1, the first integration period may begin at time t=Txpulse1−T_I+1/k, where T_I is the duration of the integration period and k is a desired sampling resolution (samples per second). As shown in FIG. 7, the waveform reconstruction component 208 initiates each integration period 704 synchronized with the start of the transmitted light pulses 702, ensuring that the relative timing between the transmitted pulse and the integration period remains fixed for each of N integration cycles of the accumulation cycle.

During each integration period 704, the waveform reconstruction component 208 measures the instantaneous electrical output q of the photo-receiver (which is a function of the light incident on the surface of the photo-receiver) and integrates q over the integration period. This process is repeated for N integration cycles (that is, for integration cycles n=0 (N−1)), and the integrated results obtained for N integration cycles are added to yield an accumulation result (Accumulation #1) for Accumulation Cycle #1. This result is represented by equation (1) below:

$$\text{Accumulation \#1} = \Sigma_0^{N-1} \int_{t=T0}^{t=T0+T\_I} q\, dt \tag{1}$$

where q is the instantaneous electrical output generated by the photo-receiver, N is the number of integration cycles performed for the accumulation cycle, and T0 is the start time for the integration period. Note that integration of the instantaneous electrical output of the photo-receiver is performed from T0 to (T0+T_I), corresponding to the time window defined by the integration period. The start time of each integration period T0 is calculated from the rising edge of the transmitted pulse, and in some instances of the accumulation cycles, the start time of the integration period T0 will be earlier in time than the rising edge of the transmitted light pulse.

Figure 8:
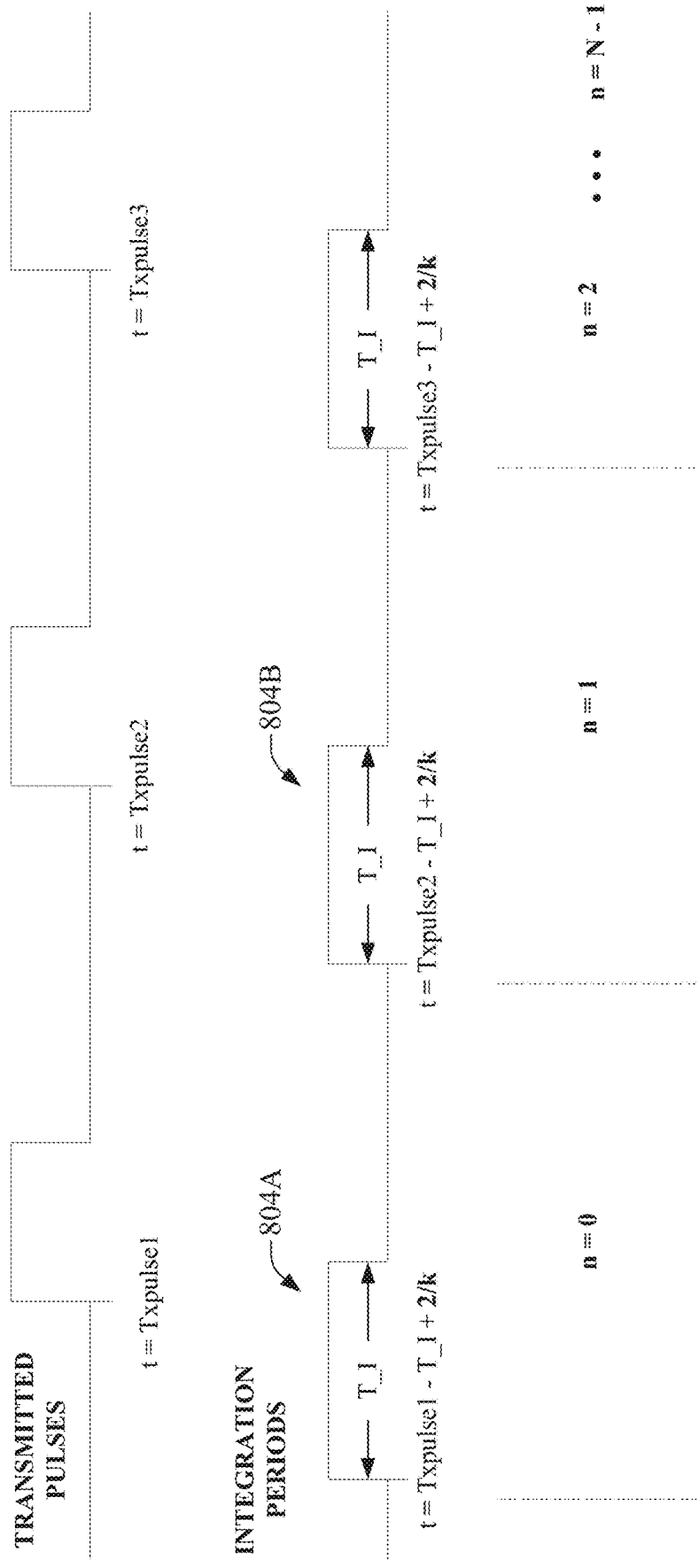
FIG. 8 is a timing chart illustrating relative timings of an emitted pulse, a reflected pulse, and integration periods for a second accumulation.

The waveform reconstruction component 208 then begins a second accumulation cycle (Accumulation Cycle #2). FIG. 8 is a timing diagram illustrating the second accumulation cycle. As in Accumulation Cycle #1, the waveform reconstruction component 208 begins Accumulation Cycle #2 by initiating an integration period 804A lasting T_I seconds for a first integration cycle n, during which the incident light energy exposed to the photo-receiver is integrated. However, for Accumulation Cycle #2, the start time for the integration period 804A is delayed relative to the start time of the integration period 704A for Accumulation Cycle #1 by 1/k seconds (that is, whereas the integration period for the first accumulation cycle was initiated at Txpulse1−T_I+1/k, the integration period for the second accumulation cycle is initiated at Txpulse1−T_I+2/k). The instantaneous electrical output q is integrated over the duration of the delayed integration period to yield an integration value for the first integration cycle (n=0), and this integration is again repeated for N total integration cycles. The integration values obtained for the N integration cycles are summed to yield the total accumulation value for the second accumulation cycle, according to equation (2) below:

$$\text{Accumulation \#2} = \Sigma_0^{N-1} \int_{t=T0+1/k}^{t=T01/k+T\_I} q\, dt \tag{2}$$

For Accumulation #2, per the delayed integration period, integration of the instantaneous electrical output of the photo-receiver is performed from T0+1/k to (T0+1/k+T_I). Repeating the integration for N integration cycles (n=0−(N−1)) yields the total accumulated value for Accumulation Cycle #2.

Once these two accumulation values have been obtained, the waveform reconstruction component 208 can calculate a value of the first sample point of the waveform by subtracting the accumulated value of the Accumulation Cycle #2 (Accumulation #2) from the accumulated value of Accumulation Cycle #1 (Accumulation #1). This difference value represents the first sampled value of the waveform for the reflected pulse between time Txpulse and Txpulse+1/k.

Figure 9:
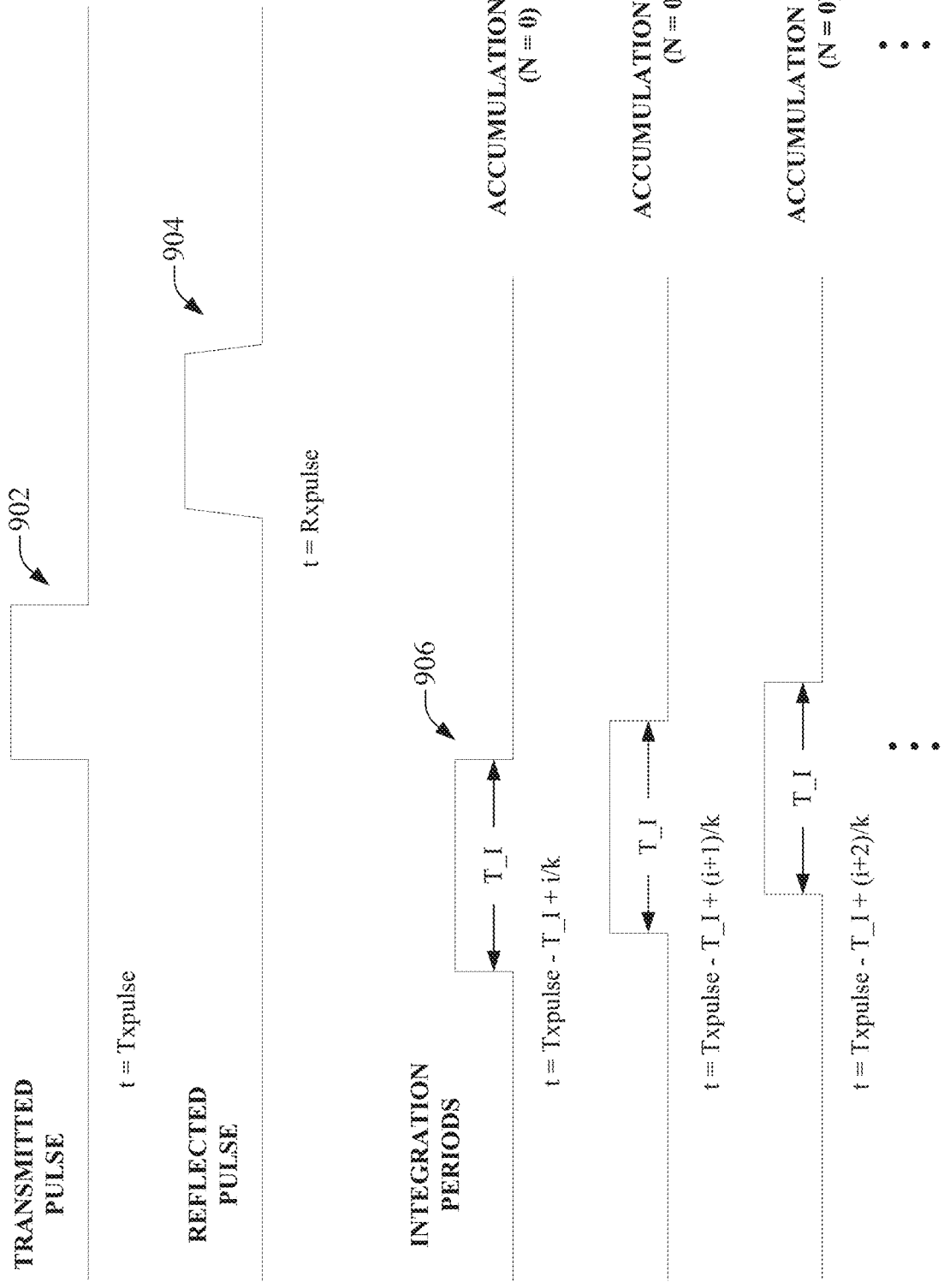
FIG. 9 is a timing diagram illustrating integration periods for multiple consecutive accumulation cycles relative to a transmitted light pulse and a reflected light pulse.

Waveform reconstruction component 208 repeats this sequence by executing additional accumulation cycles, with the start time of each integration period delayed by 1/k relative to the previous cycle. FIG. 9 is a timing diagram illustrating integration periods for multiple consecutive accumulation cycles relative to the transmitted light pulse 902 and reflected light pulse 904. In this example, only the integration periods 906 for the first integration cycle (n=0) of each accumulation cycle are shown. As shown in FIG. 9, an integration period for an ith accumulation cycle is delayed relative to integration period of the (i−1)th accumulation cycle by i/k seconds. Since the time t=Rxpulse of the rising edge of a reflected light pulse 904 seen by the photo-receptor in response to emission of transmitted light pulse 902 will remain relatively constant relative to time t=Txpulse of the rising edge of the transmitted light pulse 902 over the course of the accumulation cycles (as a function of the distance of an object in front of the TOF sensor), the shifting integration periods of each successive accumulation cycle causes an incrementally increasing portion of the reflected light pulse 904 to be included in the integration. Consequently, the difference between the accumulated electrical output of two consecutive accumulated values (I and I+1)—which is a function of the differential value between two corresponding points on the waveform representing the reflected light pulse—can be taken as the ith sampled value of the waveform between time Txpulse+i/k and Txpulse+(i+1)/k. Accordingly, the waveform reconstruction component 208 can perform N accumulation cycles, and obtain successive sampled values for the reflected waveform by subtracting the accumulation value of each accumulation cycle from the accumulation value of the immediately preceding cycle. That is, a given ith sample point is obtained using equation (3) below:

$$\text{Sample Point \#}i = \text{Accumulation \#}(i) - \text{Accumulation \#}(i+1) \tag{3}$$

Waveform reconstruction component 208 can reconstruct the entire waveform corresponding to the reflected light pulse 904 by repeating the above T_I/k times. With a sufficient number of sampled values obtained using equations (1)-(3), a plot similar to that depicted in FIG. 5 can be obtained, and the waveform for the reflected light pulse can be accurately reconstituted; e.g., by applying curve-fitting techniques to the sampled values.

Figure 10:
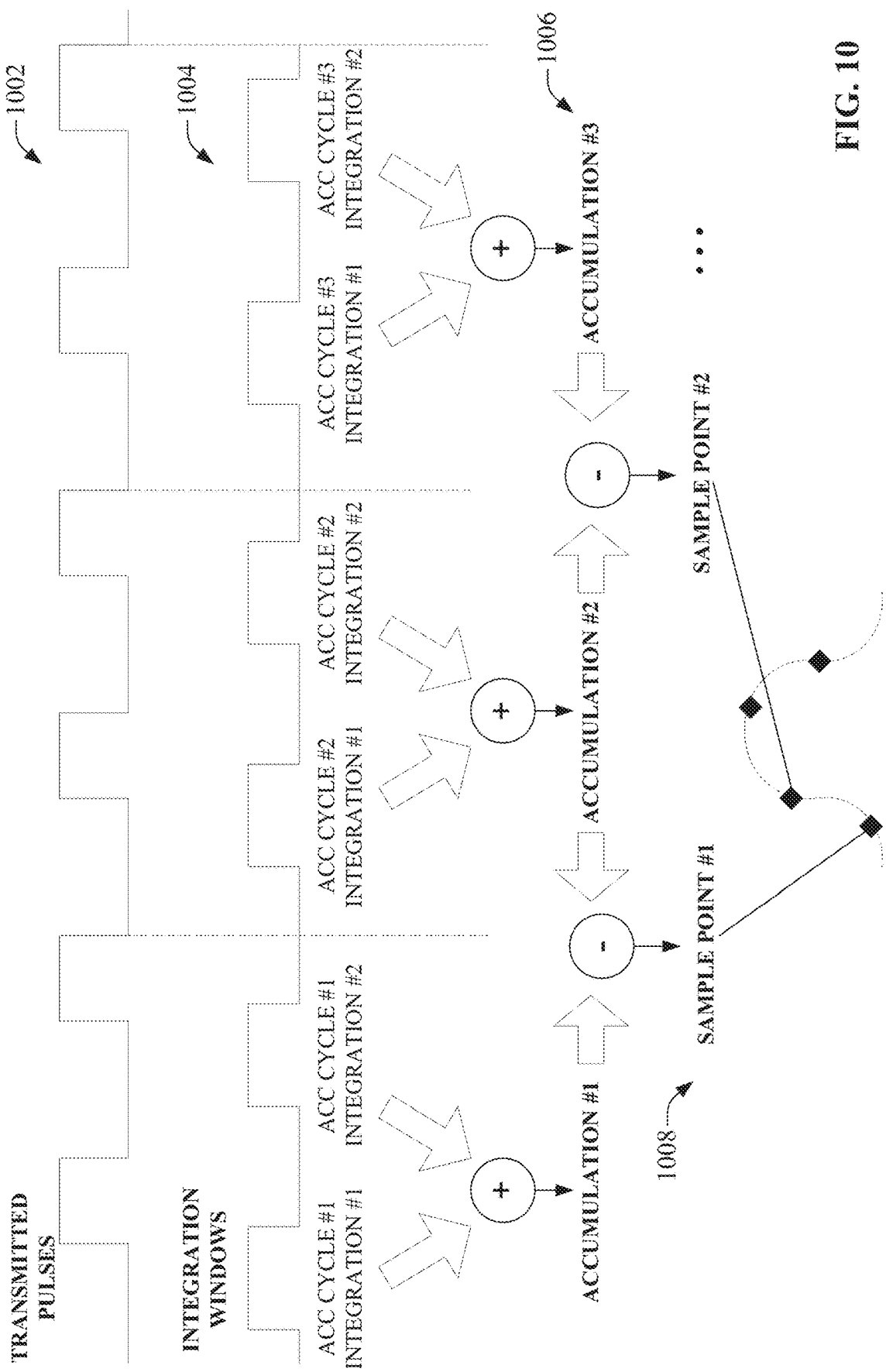
FIG. 10 is a diagram illustrating the derivation of sample points for a reflected light pulse waveform.

FIG. 10 is a diagram illustrating the derivation of sample points for a reflected light pulse waveform using the techniques described above. For simplicity, FIG. 10 only depicts three accumulation cycles, with only two integration cycles per cycle. Also, the reflected light pulses corresponding to each transmitted pulse is not shown in FIG. 10. As in previous examples, TOF sensor emits transmitted pulse 1002 within a period P. For a first accumulation cycle, the instantaneous electrical output q of the photo-receiver is integrated over respective two integration periods, and the results are added to yield Accumulation #1. For the second accumulation cycle, the integration period is delayed by 1/k relative to the integration period of the first accumulation cycle, and the process is repeated using the delayed integration period to yield Accumulation #2. For the third accumulation cycle, the integration period is delayed by 1/k relative to the integration period of the second accumulation cycle, and the process is repeated to yield Accumulation #3. The difference between Accumulation #1 and Accumulation #2 yields sample point #1, and the difference between Accumulation #2 and Accumulation #2 yields sample point #2. Repeating this for additional accumulation cycles yields a set of sample points at intervals 1/k seconds for a waveform corresponding to a received light pulse reflected in response to emission of the transmitted light pulse.

Some embodiments of the TOF sensor device 202 can also include background light compensation features to improve SNR. To this end, the waveform reconstruction component 208 may be configured to begin the accumulation period before the emitted light pulse is sent. For example, the start time T_0 of the accumulation cycle may be set to begin at T_I–1/k seconds before the rising edge of the emitted light pulse. By starting the accumulation at T_I–1/k, the waveform reconstruction component 208 can measure the background light present in the accumulation during the period before the light pulse is sent, and use this information to improve the SNR.

In some embodiments, one or more parameters of the TOF sensor device 202 can be configured as needed to suit the needs of a particular application. For example, the total integration time T_I determines the range for which objects within the viewing field will be detected. Accordingly, one or more embodiments of the TOF sensor device 202 allow the user to adjust this integration time as needed to optimize the operating range for the as required by the monitoring application.

Also, in some embodiments, the delay between accumulation cycles (that is, the delay between the completion of accumulation cycle #i and accumulation cycle #i+1) can be made variable. In this regard, the delay between accumulation cycles can be set automatically by the waveform reconstruction component 208, e.g., as a function of object distance or range or as a function of the signal to noise ratio. For example, the waveform reconstruction component 208 may set the delay between accumulation cycles to be shorter in direct proportion to the closeness of an object to the TOF sensor device. Since a shorter delay between accumulation cycles results in finer distance resolution, distance resolution is made finer the closer the object is to the TOF sensor, and resolution is decreased for objects that are farther away. Thus, resolution of the time delay—and consequently the resolution of the distance—is automatically controlled as a function of range. In this way, the waveform reconstruction component 208 is able to substantially optimize the trade-off between object distance and resolution.

Figure 11A:
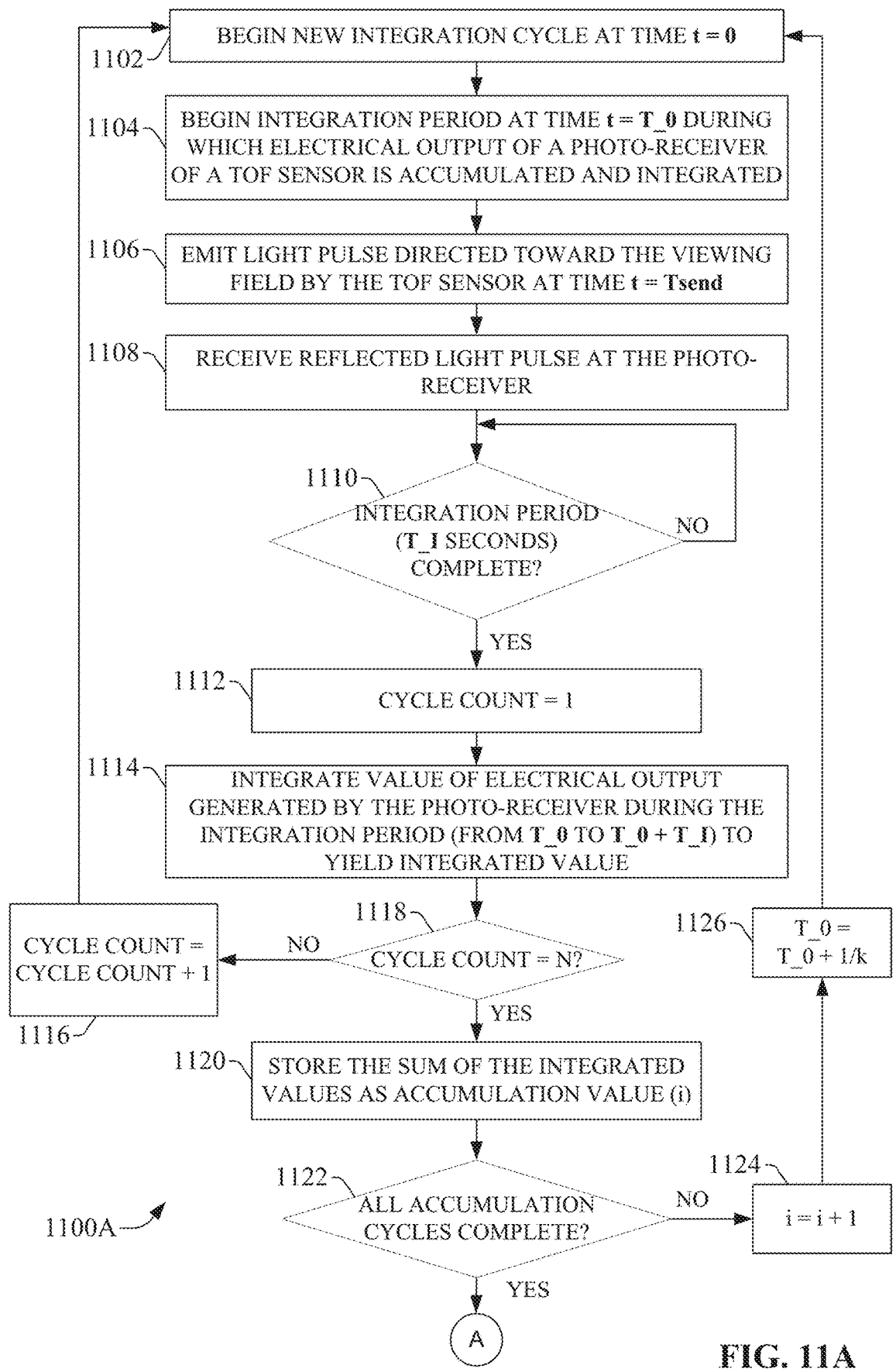
FIG. 11A is a first part of a flowchart of an example methodology for reconstructing a waveform corresponding to a reflected light pulse incident on a photo-receiver of a TOF sensor device.
Figure 11B:
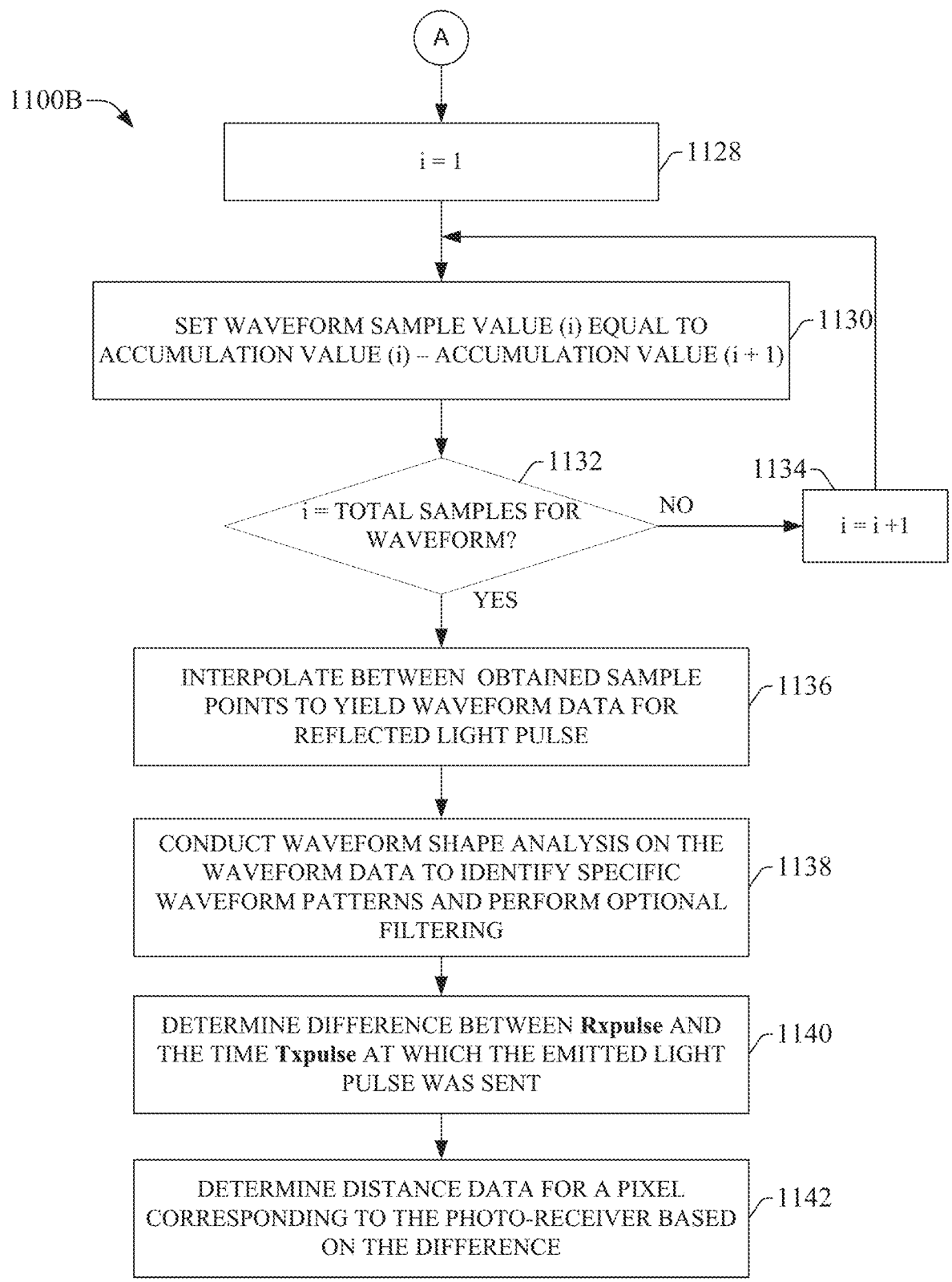
FIG. 11B is a second part of the flowchart of the example methodology for reconstructing a waveform corresponding to a reflected light pulse incident on a photo-receiver of a TOF sensor device.

FIGS. 11A-11B illustrate a methodology in accordance with one or more embodiments of the subject application. While, for purposes of simplicity of explanation, the one or more methodologies shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 11A illustrates a first part of an example methodology 1100A for reconstructing a waveform corresponding to a reflected light pulse incident on a photo-receiver of a TOF sensor device. Initially, at 1102, a new integration cycle begins at time t=0. At 1104, an integration period begins at time t=T_0. During the integration period, which lasts T_I seconds, electrical output of a photo-receiver of a TOF sensor is accumulated and integrated. At 1106, a light pulse is emitted toward the viewing field by the TOF sensor at time t=Tsend. At 1108, a reflected light is received at the photo-receiver.

At 1110, a decision is made regarding whether the integration period has completed. The integration period completes when time t==T_I. If the integration period has not completed, the methodology loops until the integration period has completed. When the integration period has completed, the methodology moves to step 1112, where an integration cycle count is set to 1. At 1114, the value of the electrical output generated by the photo-receiver during the integration period (that is, from time T_0 to (T_0+T_I)) is integrated to yield an integrated value. At 1118, a determination is made regarding whether the integration cycle count is equal to a total number of integration cycles N to be performed. If the integration cycle count is not equal to N, the methodology moves to 1116, where the cycle count is incremented. The methodology then returns to step 1102, and steps 1102-1118 are repeated for a next integration cycle, resulting in another integrated value generate at step 1114. This sequence is repeated for N integration cycles.

When it is determined at step 1118 that all N integration cycles for the current accumulation cycle have completed, the methodology moves to step 1120, where the sum of the accumulated values determined at step 1114 for all N cycles is stored as accumulated value i. This value is represented by equation (1) above. At 1122, a determination is made regarding whether all accumulation cycles have completed. In some embodiments, the number of accumulation cycles to be run is equal to T_I/k, where k is a desired sampling frequency for the waveform (in samples/second). If it is determined at step 1122 that additional accumulation cycles are to be run, the methodology moves to step 1124, where accumulation cycle pointer i is incremented (representing the next accumulation cycle), and at 1126 a delay of 1/k seconds is added to the time T_0 at which the integration period for the next cycle is to begin. The methodology then returns to step 1102, where a new integration cycle begins and steps 1102-1120 are carried out for the subsequent cycle using the delayed value of T_0 to determine the start and stop time for the integration period within the cycle. Steps 1102-1120 are repeated until all accumulation cycles have completed (e.g., T_I/k accumulation cycles), resulting in a set of accumulated values respectively corresponding to the accumulation cycles.

When it is determined at step 1122 that all accumulation cycles have completed, the second part of the example methodology 1100B is performed, as illustrated in FIG. 11B. At 1128, accumulation cycle pointer i is set to 1. At 1130, waveform sample value (i) is set equal to the accumulation value (i) minus accumulation value (i+1). That is, a given waveform sample value is calculated by determining the difference between accumulation values obtained at step 1120 for two consecutive accumulation cycles, as represented by equation (3) above.

At 1132, a determination is made regarding whether i is equal to the total samples to be obtained for the waveform. If all samples have not been obtained, the pointer i is incremented at step 1134 and the methodology returns to step 1130 to determine the next waveform sample value. When it is determined at step 1132 that all samples have been obtained, the methodology moves to step 1136, where waveform data for the reflected light pulse incident on the photo-receiver is obtained by interpolating between the sampled points (e.g., using curve-fitting techniques). At 1138, waveform shape analysis is performed on the waveform data to identify specific waveform patterns. Additionally, filtering of the waveform may be performed based on a result of the waveform shape analysis. For example, if it is determined that the waveform data corresponds to a waveform pattern that is not relevant for construction of depth map data, the waveform data may be filtered or ignored. At 1140, the difference between Rxpulse (the time of arrival of the reflected waveform) and Txpulse (the time at which the emitted light pulse was sent) is determined based on the waveform data. At 1142, distance data for a pixel corresponding to the photo-receiver is determined based on the difference determined at step 1140.

Figure 12:
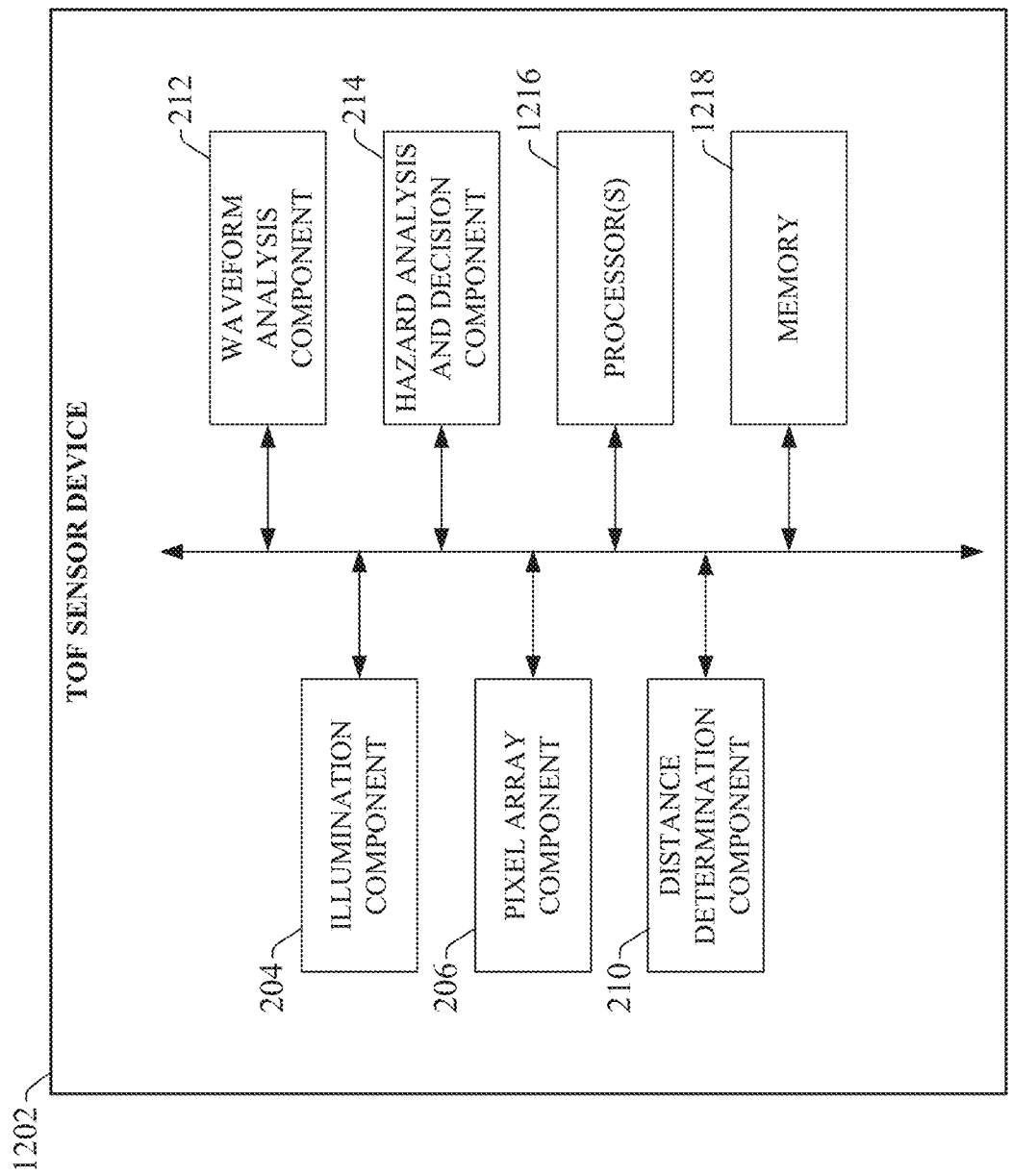
FIG. 12 a block diagram of an example TOF sensor device.

As noted above, waveform analysis component 212 can be configured to perform additional analytics on a waveform signal (e.g., a waveform signal reconstructed by waveform reconstruction component 208) to supplement the distance information derived by the distance determination component 210. In some embodiments, waveform analysis component 212 can be configured to recognize and classify some types of objects based on characteristic waveform signatures identified in a received waveform. Such object classification analysis can be performed by the waveform analysis component 212 on received pulse waveforms that have been reconstructed by waveform reconstruction component 210 according to the techniques described above, or that have been obtained using other techniques (including conventional techniques for obtaining waveforms of received light pulses). Accordingly, embodiments of waveform analysis component 212 capable of classifying objects based on recognized waveform signatures can be embodied in TOF sensor devices that include a waveform reconstruction component 208 (e.g., TOF sensor device 202), as well as in TOF sensor devices that do not include a waveform reconstruction component 210, such as TOF sensor device 1202 illustrated in FIG. 12.

Example TOF sensor device 1202 includes an illumination component 204, pixel array component 206, distance determination component 210, waveform analysis component 212, and hazard analysis and decision component 214 (as well as one or more processors 1216 and 1218), which are substantially similar to the corresponding components of TOF sensor device 202. TOF sensor device 1202 differs from TOF sensor device 202 by the omission of waveform reconstruction component 208. Rather than using the waveform reconstruction techniques described above, pixel array component 206 can use other techniques to recover waveforms representing received light pulses from the electrical output of the sensor's pixels. In general, the waveform classification functionality to be described below is not limited to use on waveforms that were reconstructed using waveform reconstruction component 208.

Figure 13:
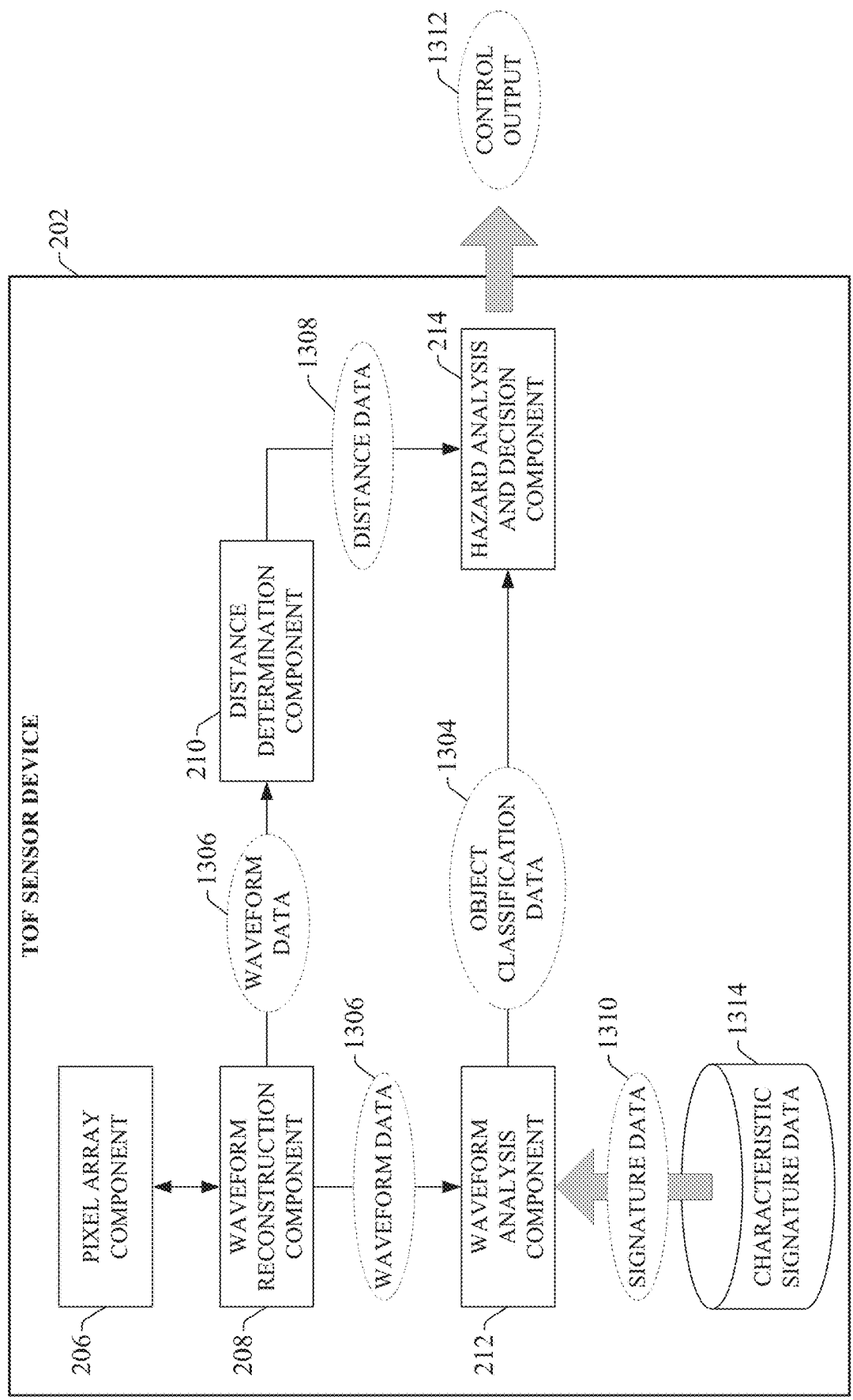
FIG. 13 is a diagram illustrating classification of objects based on waveform analysis.

FIG. 13 is a diagram illustrating classification of objects based on waveform analysis according to one or more embodiments. Although the object classification functions described herein are described in connection with TOF sensor 202, which obtains waveforms using waveform reconstruction component 208, it is to be appreciated that the object classification techniques described herein are not limited to use with sensors that include a waveform reconstruction component 208.

Similar to the system described above in connection with FIG. 3, TOF sensor device 202 (or TOF sensor device 1202) emits light pulses (e.g., LED, laser light, or remote phosphor pulses) into a viewing field and receives corresponding light pulses reflected from the viewing field. The reflected light pulses are directed to a photo-receiver array (not shown in FIG. 13), which generates respective electrical outputs for each pixel of the ray as a function of the intensity of the light pulse received at each photo-receiver. Pixel array component 206 obtains periodic samples of the voltage output of each pixel of the photo-receiver array, and waveform reconstruction component 208 generates waveform data 1306 representing the received pulses (alternatively, in the case of TOF sensor device 1202, the pixel array component 206 may generate the waveform data 1306 using other techniques without the use of waveform reconstruction component 208). Distance determination component 210 can determine a distance value associated with one or more of the pixels based on analysis of the waveform data 1306. By performing waveform reconstruction and distance determination for each pixel in the pixel array, distance determination component 210 can generate distance data 1308, which can be used to create a depth map of the viewing field.

In addition to providing waveform data 1306 to the distance determination component 210 for estimation of object distance, TOF sensor device 202 also provides the waveform data 1306 to waveform analysis component 212 for object classification analysis. In general, light reflected back to the receiver of TOF sensor device 1202 may yield different waveform signatures based on the type of object from which the pulse was reflected, as well as the atmospheric conditions within the viewing field. For example, some object types may return waveforms that represent relatively specular reflection, while waveforms from other types of objects may represent more diffuse reflection. TOF sensor device 202 (or TOF sensor device 1202) can be trained to recognize different object classifications based on the shape of the waveform returned from those objects. Objects or conditions that can be identified based on waveform signatures can include, but are not limited to, snow, aerosols, water, fog, or mist.

To facilitate signature-based object classification, TOF sensor device 202 can include a characteristic signature data store 1314 (e.g., part of memory 218) that stores characteristic waveform signature data 1310 corresponding to different object or condition classifications. Waveform signature data 1310 can comprise characteristic signature profiles correlated to respective different classifications of objects or atmospheric conditions. When new waveform data 1306 is received, waveform analysis component 212 can compare the waveform data 1306 with the signature data 1310 stored on characteristic signature data store 1314, and identify which, if any, of the stored signature profiles substantially match the pixel waveform profile defined by waveform data 1306 within a defined margin. Based on the degree of similarity between waveform data 1306 and its most closely corresponding signature profile defined by signature data 1310, waveform analysis component 212 can generate object classification data 1304 assigning an object classification to the waveform. For example, if waveform analysis component 212 determines that waveform data 1306 defines a waveform profile that substantially matches a stored signature profile corresponding to snow within the defined margin, waveform analysis component 212 will classify the object measured by the pixel as "snow," and indicate this classification as object classification data 1304.

In some embodiments, rather than basing the classification on a single received waveform for the pixel, waveform analysis component 212 can also base the classification on a measured change in the received waveform profile over time. In this regard, the manner in which a received pulse's profile changes over time may be indicative of the type of object or the atmospheric conditions within the viewing field. Tracking temporal changes in the waveform profile over time can be useful for detecting certain types of ambient conditions, such as rainfall or other precipitation. For example, objects having a relatively uneven surface will typically produce more diffuse reflected pulses relative to smoother reflective objects. In some cases, this degree of diffusion can be detected more accurately by observing the changes in the received waveform over time; e.g., by observing that the reflected light alters sporadically over time relative to a more consistent reflection. Accordingly, one or more of the signature profiles defined in signature data 1310 can define an expected change pattern—as a function of time—corresponding to one or more object classifications. In such embodiments, waveform analysis component 212 can monitor received waveform data 1306 for a pixel over time and compare both the signature of the individual waveforms as well as the changes to the waveforms over time with the signature profiles stored in characteristic signature data store 1314 in order to determine a classification for the object corresponding to the pixel.

In some embodiments, waveform analysis component 212 can also determine a classification for an object based on spatial data as well as waveform signature data. According to such embodiments, an object classification can be determined based on combined information from neighboring pixels corresponding to the object or condition being classified. This can include combining the waveform signature data from one or more pixels associated with the object with shape information obtained through analysis of the pixels as a whole, combining waveform signature data for multiple pixels in order to determine how the signature changes across neighboring pixels, or other such data aggregations.

Once the waveform analysis component 212 has determined a classification associated with the object, the object classification data 1304 can be passed to the hazard analysis and decision component 214, which can use the classification data 1304, alone or together with the distance data 1308 for the pixel, to generate a suitable control output 1312 if determined necessary based on the distance and classification data. Control output 1312 can be a discrete or analog control output to another device (e.g., an industrial controller or safety device), or a message output directed to a human-machine interface or another client device. For example, based on the distance data 1308 as well as the object classification data 1304, hazard analysis and decision component 214 may send a control signal to an industrial device or controller to perform a control action or initiate a safety action. Such control or safety actions can include, for example, instructing a controlled industrial process to halt or to enter a slow mode, or otherwise instructing the controlled industrial process to enter a safe state. Hazard analysis and decision component 214 can also send a message to a client device indicating presence of an object corresponding to the identified classification.

In an example implementation, the hazard analysis and decision component 214 may be configured to generate a control output 1312 only if an object detected within a defined distance range corresponds to an object type defined as requiring a control output, while allowing objects corresponding to other object types to pass within the defined distance range without initiating a control output 1312. In another example, the hazard analysis and decision component 214 may change a depth of a dynamic safety zone being monitored by the TOF sensor device 202 based on the classification of the object as determined by the waveform analysis component 212.

Figure 14:
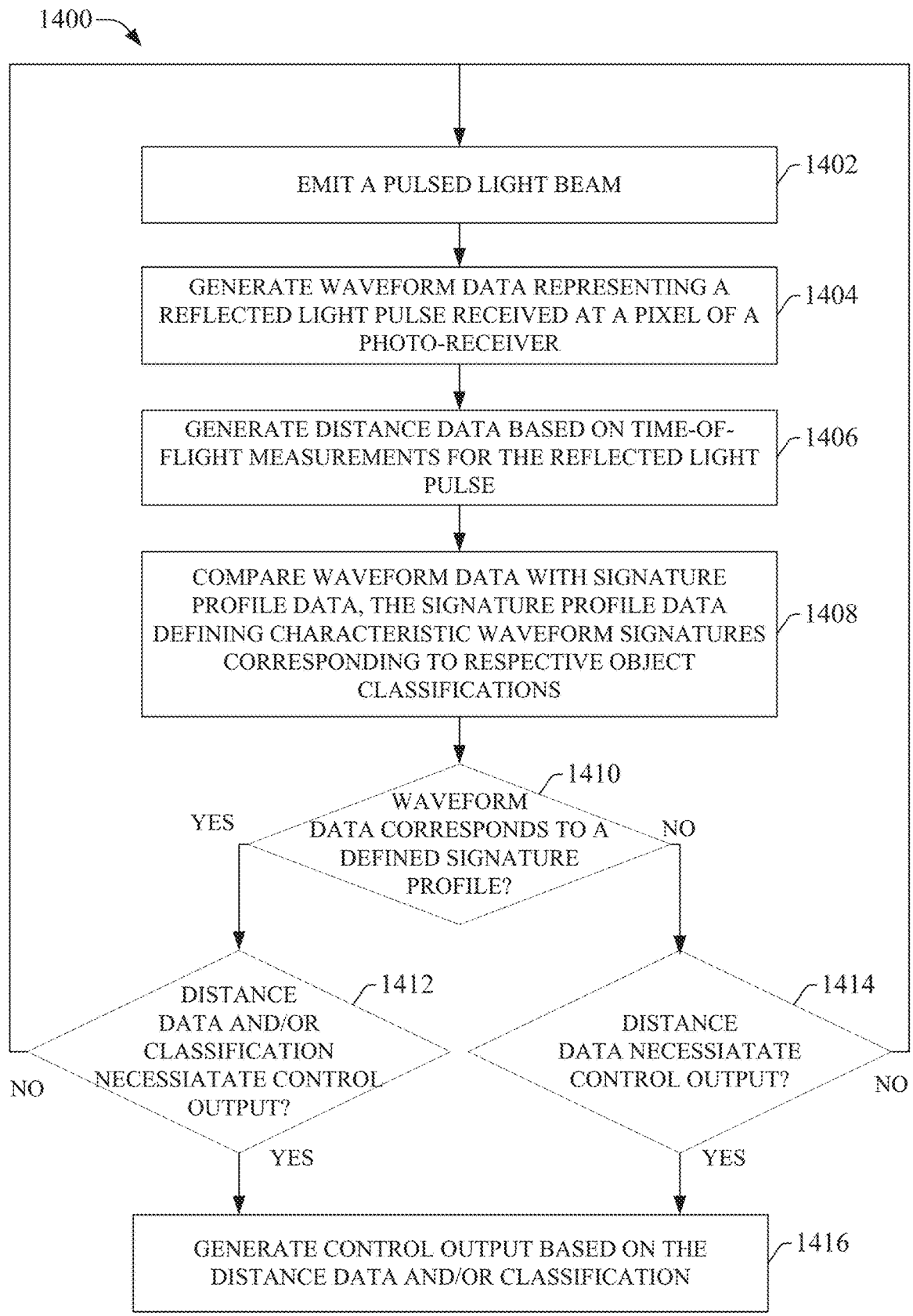
FIG. 14 is a flowchart of an example methodology for classifying an object based on identified waveform characteristics.

FIG. 14 illustrates an example methodology 1400 for classifying an object based on identified waveform characteristics. Initially, at 1402, a pulsed light beam is emitted; e.g., by an illumination component of a TOF sensor device. At 1404, waveform data representing a reflected light pulse received at a pixel of a photo-receiver is generated. The waveform data can be generated, for example, based on measurement samples taken of an electrical output of a pixel of the photo-receiver. At 1406, distance data is generated based on time-of-flight measurements performed on the reflected light pulse.

At 1408, the waveform data generated at step 1404 is compared with signature profile data, where the signature profile data defines characteristic waveform signatures corresponding to respective object classifications. At 1410, a determination is made as to whether the waveform data generated at step 1404 corresponds to a defined signature profile based on the comparison performed at step 1408. Correspondence to a defined signature profile is indicative of a classification of an object corresponding to the pixel. If the waveform data corresponds to a defined signature profile (YES at step 1410), the methodology proceeds to step 1412, where a determination is made as to whether the distance data and/or classification determined based on the comparison performed at step 1408 necessitates generation of a control output by the TOF sensor device. If a control output is to be generated based on the distance data and/or classification (YES at step 1412), the methodology proceeds to step 1416, where a control output is generated based on the distance data information and/or the classification. If neither the distance data nor classification necessitates a control output (NO at step 1412), the methodology returns to step 1402 and repeats.

If the waveform data is not determined to correspond to a defined signature profile (NO at step 1410), the methodology proceeds instead to step 1414, where a determination is made as to whether the distance data alone necessitates a control output. If the distance data necessitates a control output (YES at step 1414), the methodology proceeds to step 1416, where the control output is generated. If the distance data does not necessitate a control output (NO at step 1414), the methodology 1400 returns to step 1402 and repeats.

In addition to, or as an alternative to, the techniques described above, one or more embodiments can be configured to identify presence of atmospheric conditions within the viewing field that may adversely affect the accuracy of object detection by the TOF sensor device. As an example of such atmospheric conditions, the presence of mist or dust between the sensor device and an object within the sensor's viewing field can result in partial occlusion of pixels, reducing the accuracy of object detection and distance measurement. The loss of accuracy as a result of mist or other pollutants in the air can render the sensor device unsuitable for industrial safety applications. In order to detect the presence of mist at levels that may result in a loss of distance measurement accuracy, one or more embodiments of the TOF sensor device can be configured to execute a spot pattern analysis during a testing phase, whereby the sensor device imposes a defined spot pattern on the light emitted by the sensor's illumination component. RGB or grayscale analysis can then be used to analyze the resulting reflected pattern to determine whether the reflected pattern is indicative of the presence of mist within the viewing field.

Figure 15:
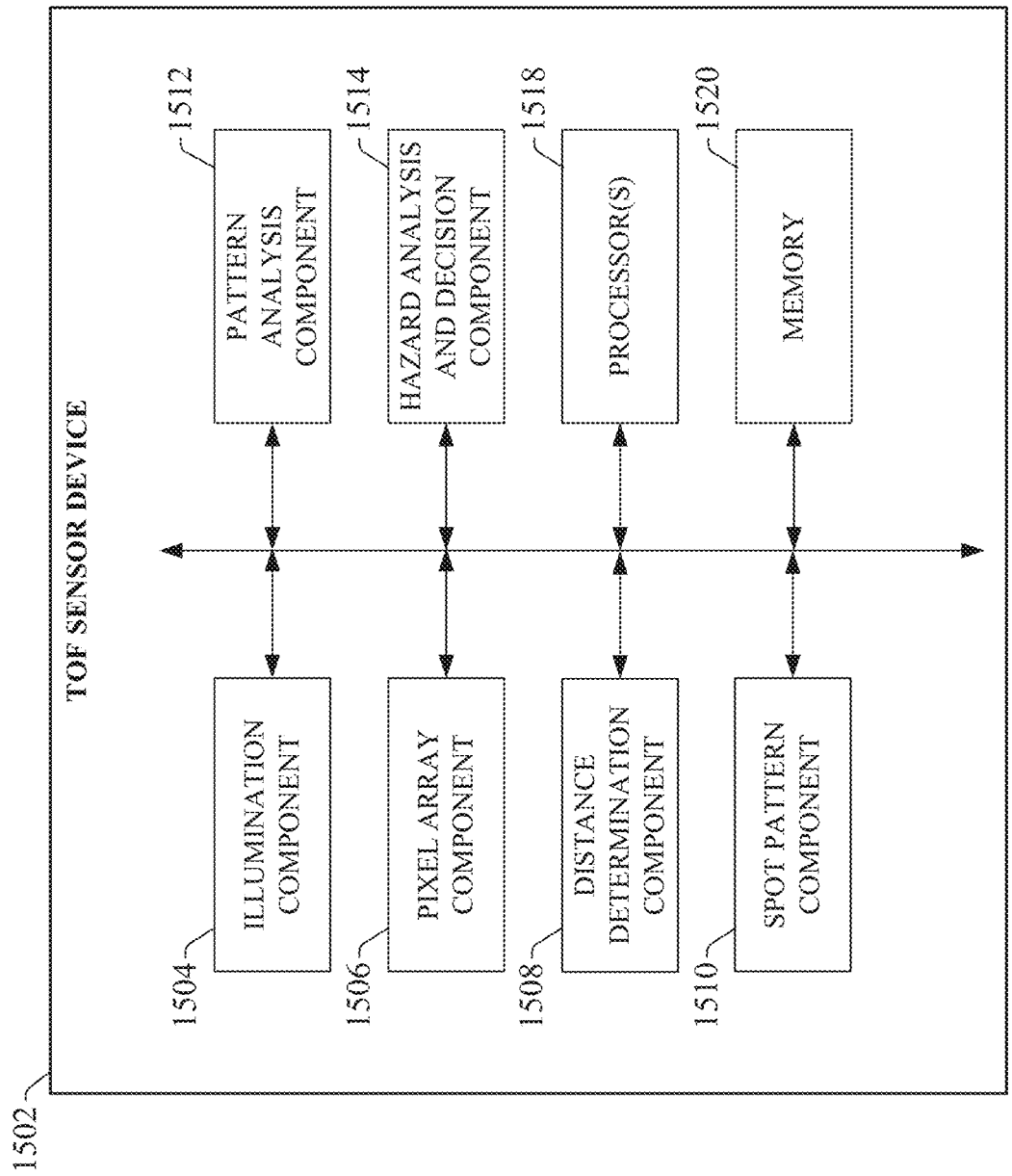
FIG. 15 is a block diagram of an example TOF sensor device capable of using spot pattern analysis to identify the presence of mist.

FIG. 15 is a block diagram of an example TOF sensor device 1502 capable of using spot pattern analysis to identify the presence of mist according to one or more embodiments of this disclosure. Although the spot matrix techniques are described herein in connection with a TOF sensor device 1502 that measures distance using time-of-flight techniques, these spot matrix techniques are not limited to use within the context of such TOF sensor devices. Rather, the spot matrix techniques can also be implemented within devices that implement other imaging technologies, such as triangulation. Also, the spot matrix techniques described below can be implemented in traditional TOF sensor devices or other types of imaging systems, or can be combined with one or more other features described above. For example, in one or more embodiments the spot matrix functionality can be implemented in TOF sensor device 202 in combination with waveform reconstruction functionality, in TOF sensor device 1202 in connection with waveform-based object classification, or in a TOF sensor device that includes both waveform reconstruction and object classification functionalities.

Example TOF sensor device 1502 includes an illumination component 1504, a pixel array component 1506, a distance determination component 1508, and a hazard analysis and decision component 1514, which perform functionalities similar to corresponding components 204, 206, 210, and 214 of TOF sensor device 202. In addition, TOF sensor device 1502 includes a spot pattern component 1510 and a pattern analysis component 1512. In various embodiments, one or more of the illumination component 1504, pixel array component 1506, distance determination component 1508, spot pattern component 1510, pattern analysis component 1512, hazard analysis and decision component 1514, the one or more processors 1518, and memory 1520 can be electrically and/or communicatively coupled to one another to perform one or more of the functions of the TOF sensor device 1502. In some embodiments, components 1504, 1506, 1508, 1510, 1512, and 1514 can comprise software instructions stored on memory 1520 and executed by processor(s) 1518. TOF sensor device 1502 may also interact with other hardware and/or software components not depicted in FIG. 15. For example, processor(s) 1518 may interact with one or more external user interface devices, such as a keyboard, a mouse, a display monitor, a touchscreen, another sensor, a network, a safety device, or other such interface devices.

Spot pattern component 1510 can be configured to control illumination component 1504 during a testing phase to emit a defined pattern of light beams, resulting in an emitted spot pattern. Pattern analysis component 1512 can be configured to analyze a spot pattern reflected from the viewing field and determine whether the reflected pattern is indicative of the presence of excessive mist within the viewing field.

Figure 16:
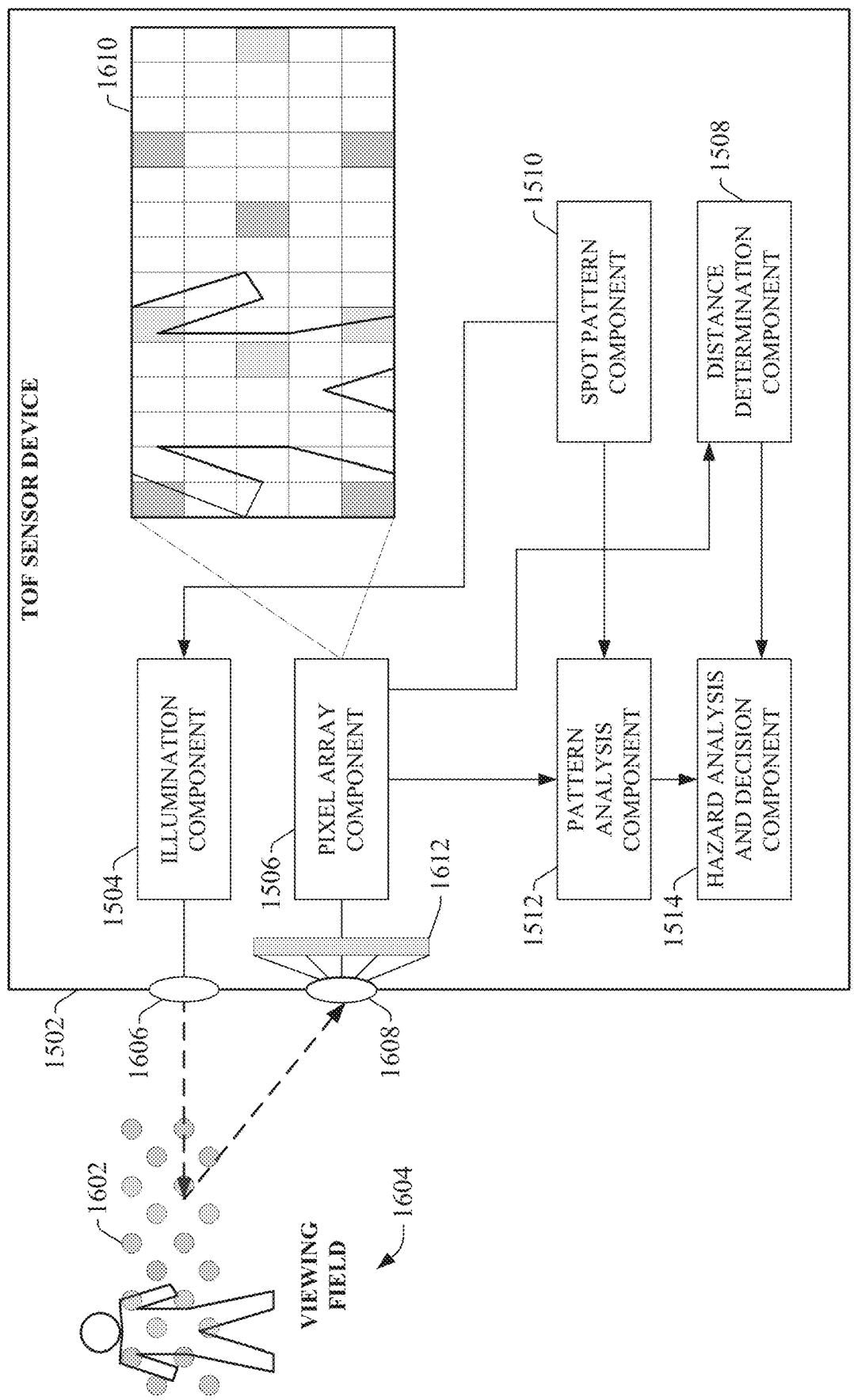
FIG. 16 is a block diagram illustrating components of an example TOF sensor device configured to detect mist using spot pattern analysis.

FIG. 16 is a block diagram illustrating components of the TOF sensor device 1502 according to one or more embodiments. As in previous examples, illumination component 1504 controls emission of LED, laser, or remote phosphor light to the viewing field 1604 via emitting lens 1606. For example, illumination component 1504 may project a wide beam of light pulses (e.g., a cone-shaped beam) over the viewing field (e.g., a cone-shaped beam). Receiver lens element 1608 receives light pulses reflected from the viewing field 1604 and directs the reflected light pulses to a photo-receiver array 1612, which generates respective electrical outputs for each pixel of the array as a function of the intensity of the light pulse received at each photo-receiver. Pixel array component 1506 performs a readout of the photo-receiver array 1612 to obtain samples of the voltage output data for each pixel for analysis, and waveform data representing reflected pulses received at pixels of the photo-receiver array 1612 is generated (e.g., either by the pixel array component 1506 itself or by waveform reconstruction component 208 in embodiments that support waveform reconstruction). Distance determination component 1508 generates distance information for respective pixels based on the waveform data (e.g., using time-of-flight calculations, triangulation, or other distance determination techniques), and hazard analysis and decision component 1514 controls a discrete, analog, or message output based on the distance information.

In addition to this distance determination functionality, TOF sensor device 1502 is configured to carry out a test sequence to determine whether a level of mist present in viewing field 1604 exceeds a maximum level that ensures accurate object detection and distance determination. In general, this is achieved by emitting a pattern of relatively small beams of light into the viewing field 1604, and determining whether the pattern reflected back to the TOF sensor device 1502 deviates from the emitted pattern to a degree that indicates a high level of mist in the atmosphere.

In some embodiments, the test sequence can be performed periodically by the TOF sensor device 1502 (e.g., once every 10 minutes). During the test sequence, spot pattern component 1510 instructs illumination component 1504—or a separate illumination component—to impose a defined pattern of light spots 1602 on the light emitted into the viewing field 1604. This can be achieved, for example, by emitting a pattern of focused light beams that are brighter than the pulsed light emitted by illumination component 1504 for distance determination purposes. Alternatively, in some embodiments the pattern of focused light beams can be emitted during a period when pulsed light is not being emitted by illumination component 1504 for distance determination purposes. Portions of the emitted light spots will be reflected to the photo-receiver array 1612, and an image 1610 is generated from the pixel data based on the reflected light received at the photo-receiver array 1612. Pattern analysis component 1512 can then identify which pixels of the image 1610 correspond to the emitted spots—e.g., based on the relative brightness of those pixels—and analyze the reflected pattern defined by these identified spots. Pattern analysis component 1512 can then determine whether the presence of mist, dust, or other particulates suspended in the viewing field have distorted the reflected pattern relative to the defined pattern to a degree that indicates an excessively high concentration of particulates that may result in inaccurate object detection and measurement.

In general, excessive mist or other particulates can cause a scattering of light emitted into the viewing field 1604. Consequently, when the spot pattern is emitted into an area having a high level of suspended particulates, the spot pattern reflected back to the receiver becomes distorted or lost. Pattern analysis component 1512 can compare the detected pattern identified in image 1610 with the pattern defined by spot pattern component 1510 and determine a degree of distortion or deviation between the received and defined patterns based on the comparison. If pattern analysis component 1512 determines that this degree of deviation exceeds a threshold indicative of a high degree of suspended particulates that may reduce the accuracy of object detection and measurement, the pattern analysis component 1512 can send an instruction to hazard analysis and decision component 1514 to take an appropriate action. In an example embodiment, hazard analysis and decision component 1514 can output a control signal that causes an associated controlled industrial process to enter a shut-down mode in response to the instruction from pattern analysis component 1512, thereby preventing accidental damage or injury as a result of unreliable object or distance detection. Hazard analysis and decision component 1514 can also send an alarm message to a server, a human-machine interface, or one or more client devices indicating that atmospheric conditions around the sensor device 1502 are such that reliable object and distance detection cannot be guaranteed.

Figure 17:
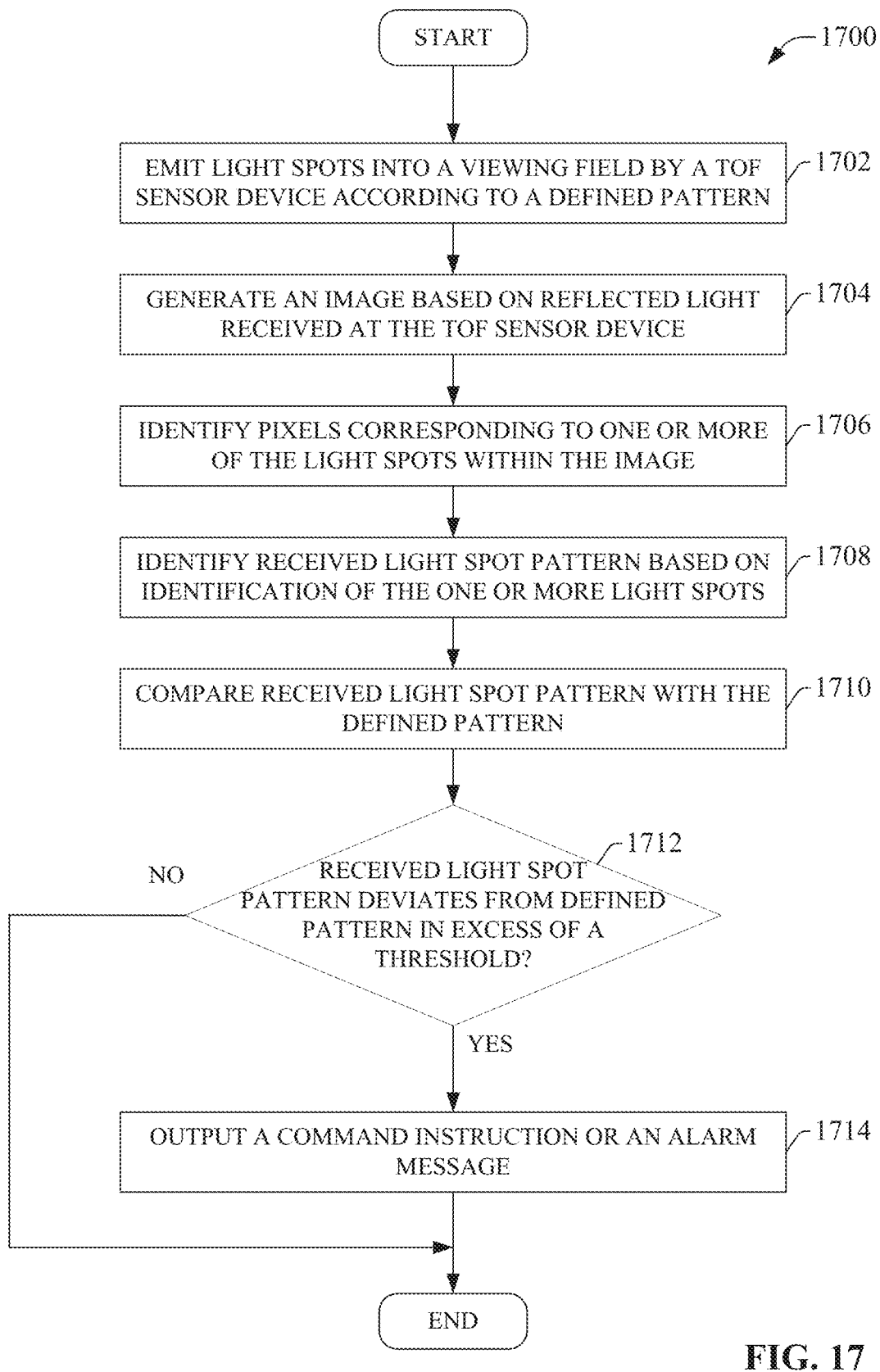
FIG. 17 is a flowchart of an example methodology for detecting excessive levels of mist within a viewing field of a TOF sensor device or other types of imaging devices.

FIG. 17 illustrates an example methodology 1700 for detecting excessive levels of mist within a viewing field of a TOF sensor device or other types of imaging devices. Initially, at 1702, light spots are emitted into a viewing field of a TOF sensor device (or another type of imaging device) according to a defined pattern. In one or more embodiments, the light spots can comprise concentrated beams of light imposed on pulsed light emitted by the TOF sensor illumination component. At 1704, an image is generated based on reflected light received at the TOF sensor device.

At 1706, pixels corresponding to one or more of the light spots are identified within the image. At 1708, a received light spot pattern is identified based on the one or more light spots identified at step 1706. At 1710, the received light spot pattern identified at step 1708 is compared with the defined pattern of light spots that were emitted into the viewing space at step 1702.

At 1712, a determination is made, based on the comparison performed at step 1710, as to whether the received light spot pattern deviates from the defined pattern in excess of a threshold. If the received light spot pattern deviates from the defined pattern in excess of the threshold (YES at step 1712), the methodology proceeds to step 1714, where a command instruction or an alarm message is output by the TOF sensor device. The command instruction may be, for example, a control signal that halts a controlled industrial process to ensure that no damage or injury is incurred as a result of possible loss of detection accuracy of the TOF sensor device. The alarm message may be an indication that atmospheric conditions around the TOF sensor device are such that the sensor device's detection accuracy is not reliable.

Figure 18:
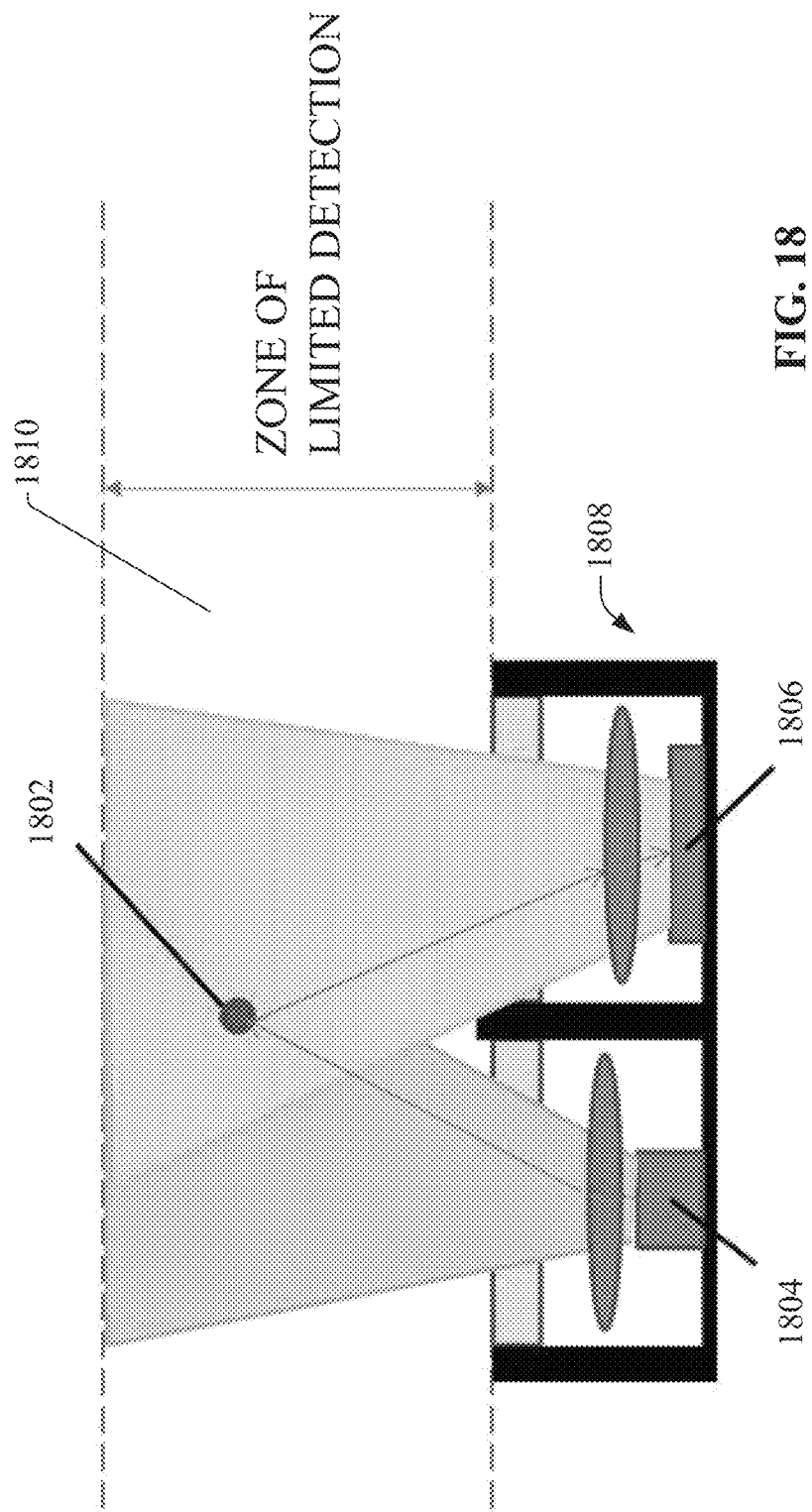
FIG. 18 is a diagram illustrating the zone of limited detection of an example TOF sensor device.

In addition to the features described above, one or more embodiments of the TOF sensor device described herein can be configured to compensate for the presence of mist or other particulates within the sensor's zone of limited detection (ZLD). FIG. 18 is a diagram illustrating the ZLD of an example TOF sensor device 1808 (or another type of optical area sensor). Sensor 1808 includes an emitter 1804 that emits a light beam into the viewing field, and a chip receiver 1806 that receives reflected light (as well as ambient light) from the viewing field. Relative to the sensor 1808, the perception area is the zone in which objects above a minimum size are within both the emitted light field and the viewing field, and are guaranteed to be detected by the sensor 1808. An area outside this perception area, but still within both the viewing space and emitting space of the sensor 1808 (e.g., the area immediately in front of the sensor window or lens), is known as the zone of limited detection (ZLD) 1810. Although the sensor 1808 may be capable of generating distance values for an object 1802 within the ZLD, these measurements may not be accurate. In some scenarios, the range or shape of the ZLD of the sensor 1808 may be a function of mist or particulates between the sensor 1808 and the object 1802, which can cause a slew in the time signature of the reflected light signal (when the pulsed time-of-flight method is used) or partial occlusion of pixels, resulting in incorrect object measurement.

Figure 19:
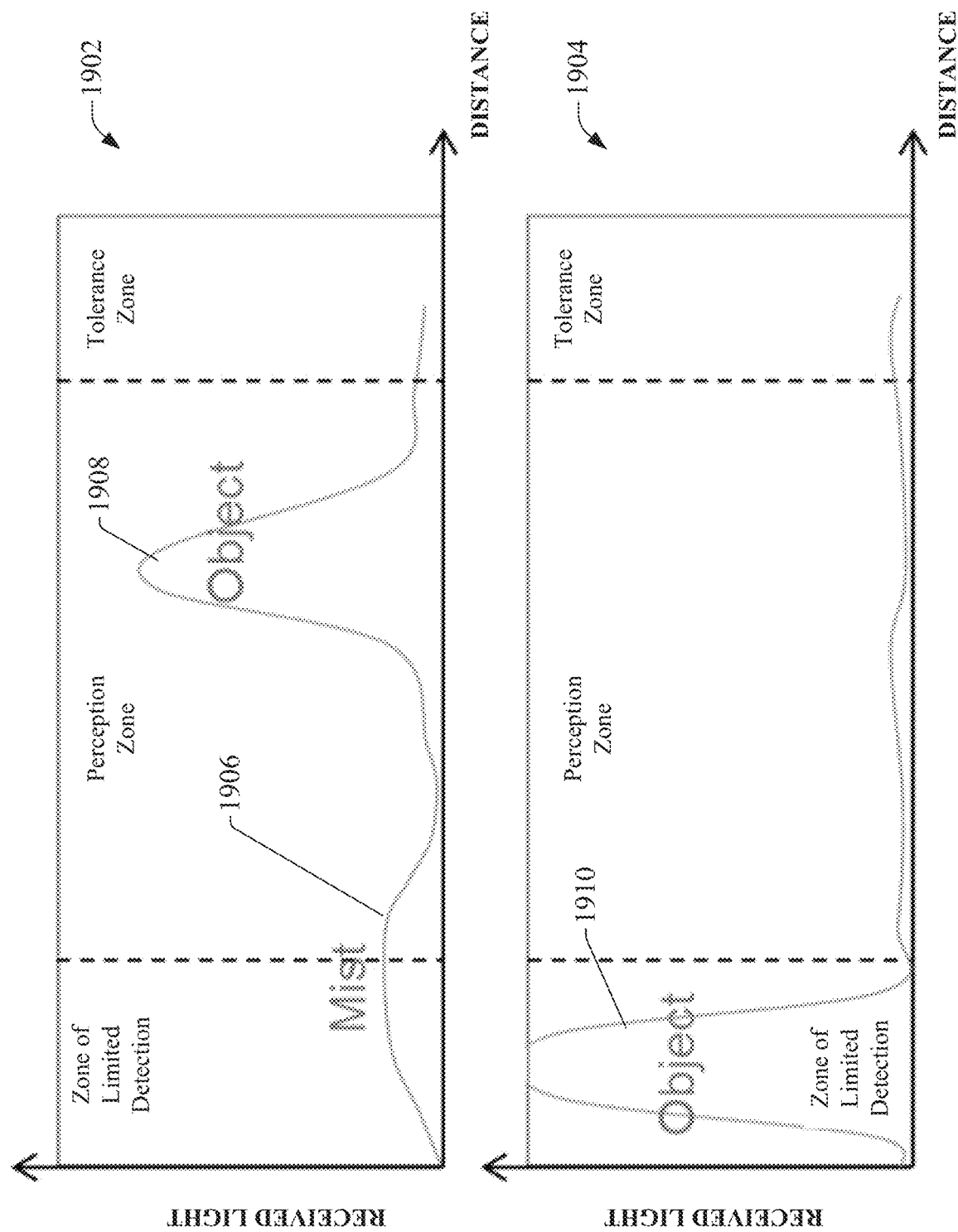
FIG. 19 is a first graph and a second graph plotting an amount of light reflected back to a sensor as a function of distance from the sensor for two different object positions.

Sensor 1808 can more accurately measure the distance of an object 1802 within the ZLD if the sensor 1808 can draw a distinction between mist and the object 1802 inside the ZLD. For example, object 1802 may be detected in the returned waveform in the time domain, allowing for detection of the object 1802 through the mist. FIG. 19 is a first graph 1902 and a second graph 1904 plotting an amount of light reflected back to the sensor 1808 as a function of distance from the sensor 1808 for two different object positions. Graph 1902 represents a scenario in which an object—represented by the rise 1908 in received light—is located within the perception zone (outside the ZLD). As indicated by the shape of the smaller rise 1906 in received light within the ZLD, some light is reflected back to the sensor 1808 due to mist or other particulates suspended near the sensor 1808. Graph 1904 represents a scenario in which the object has moved closer to the sensor 1808 and now resides within the ZLD. As such, rise 1910 in the received light is attributable to both light from the object as well as light reflected by the mist.

In some embodiments, distance determination component 210 can be configured to differentiate between the mist and the object using time-domain analysis. For example, these embodiments of distance determination component 210 can be configured to identify the amount of light attributable to mist (represented by rise 1906) at a time prior to entry of the object within the ZLD, and to record this amount of light as a baseline. Subsequently, when the object enters the ZLD, the recorded baseline representing the amount of light reflected by the mist can be subtracted from the total amount of received light in order to more accurately obtain a waveform representative of the object, thereby allowing the object to be detected through the mist.

Monitoring of objects with the ZLD can also be rendered more accurate by installing polarizing filters at the light emitter 1804 and receiver 1806 of sensor 1808. Such filters can allow the sensor 1808 to detect objects through the mist without incorrect object measurement. In an example implementation, polarizing filters can be integrated directly onto the chip surface.

Embodiments, systems, and components described herein, as well as industrial control systems and industrial automation environments in which various aspects set forth in the subject specification can be carried out, can include computer or network components such as servers, clients, programmable logic controllers (PLCs), automation controllers, communications modules, mobile computers, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including DeviceNet, ControlNet, Ethernet/IP, safety networks (e.g., CIP safety), etc. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 20:
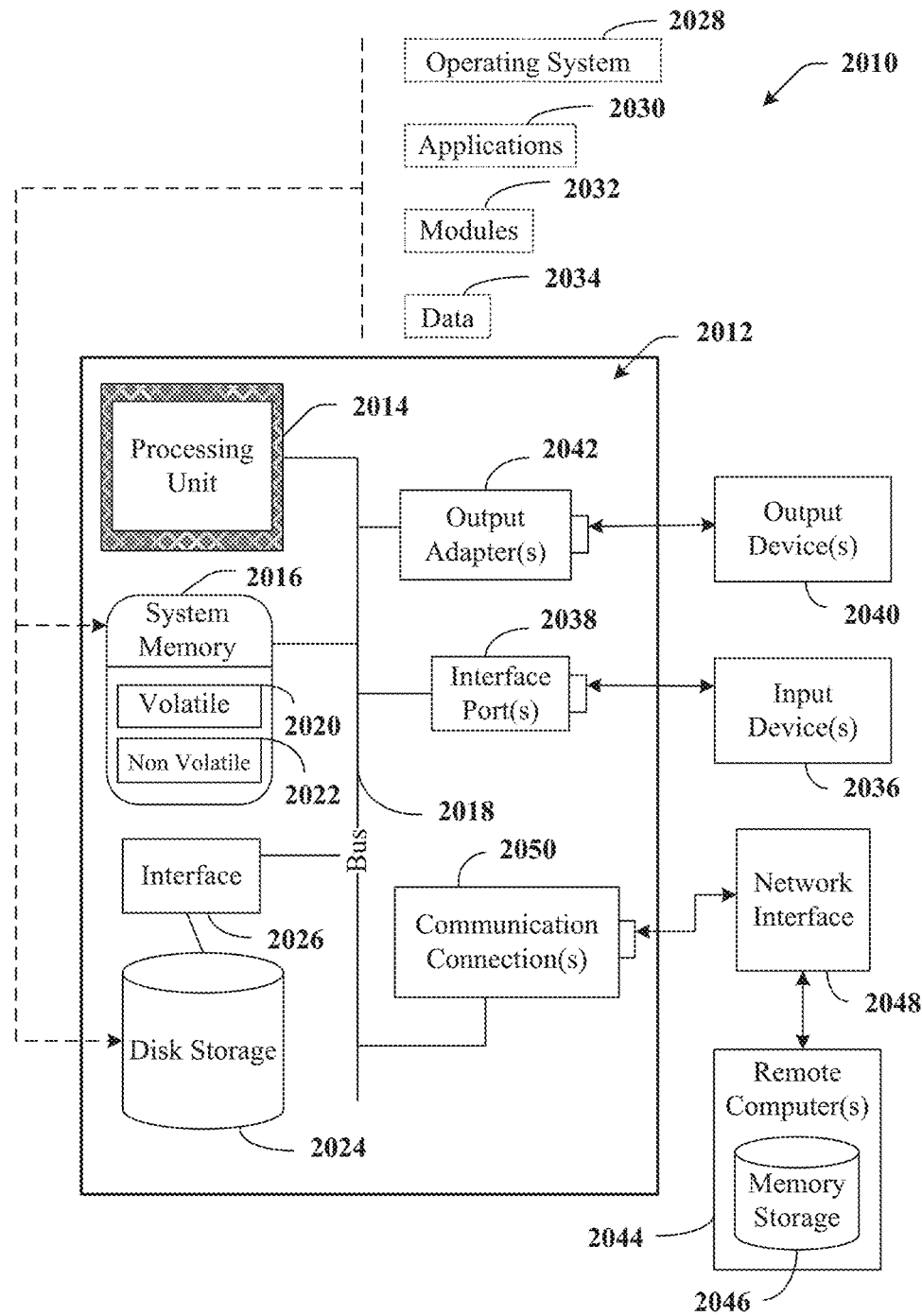
FIG. 20 is an example computing environment.
Figure 21:
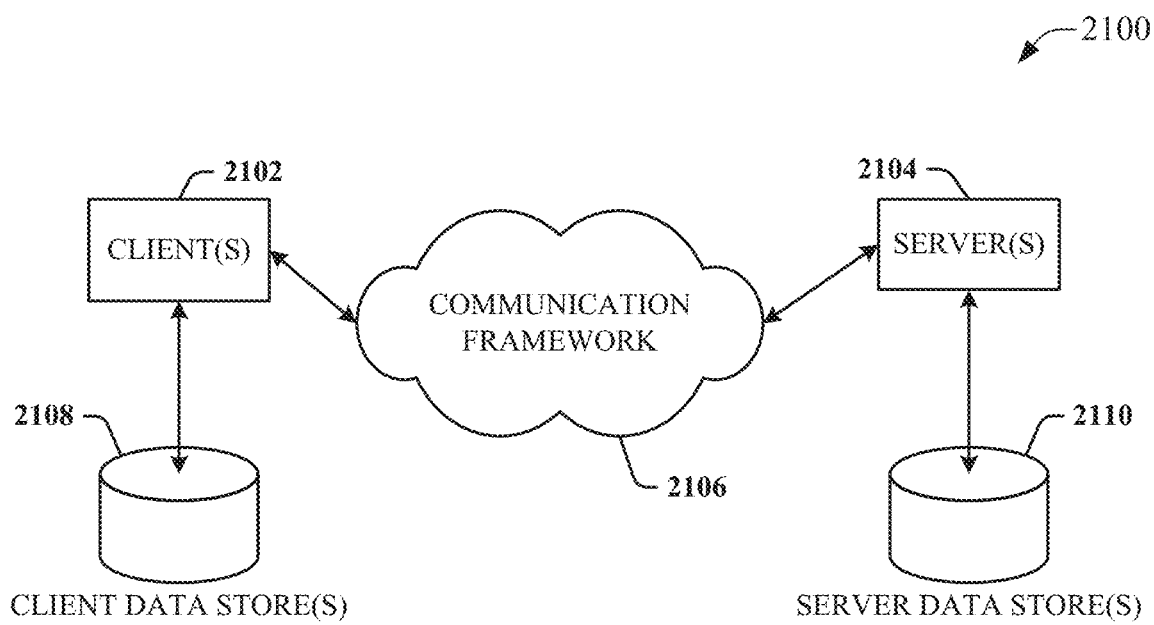
FIG. 21 is an example networking environment.

In order to provide a context for the various aspects of the disclosed subject matter, FIGS. 20 and 21 as well as the following discussion are intended to provide a brief, general description of a suitable environment in which the various aspects of the disclosed subject matter may be implemented.

With reference to FIG. 20, an example environment 2010 for implementing various aspects of the aforementioned subject matter includes a computer 2012. The computer 2012 includes a processing unit 2014, a system memory 2016, and a system bus 2018. The system bus 2018 couples system components including, but not limited to, the system memory 2016 to the processing unit 2014. The processing unit 2014 can be any of various available processors. Multi-core microprocessors and other multiprocessor architectures also can be employed as the processing unit 2014.

The system bus 2018 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 2016 includes volatile memory 2020 and non-volatile memory 2022. The basic input/output system (BIOS), containing the basic routines to transfer information between elements within the computer 2012, such as during start-up, is stored in nonvolatile memory 2022. By way of illustration, and not limitation, nonvolatile memory 2022 can include read only memory (ROM), programmable ROM (PROM), electrically programmable ROM (EPROM), electrically erasable PROM (EEPROM), or flash memory. Volatile memory 2020 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 2012 also includes removable/non-removable, volatile/non-volatile computer storage media. FIG. 20 illustrates, for example a disk storage 2024. Disk storage 2024 includes, but is not limited to, devices like a magnetic disk drive, floppy disk drive, tape drive, Jaz drive, Zip drive, LS-100 drive, flash memory card, or memory stick. In addition, disk storage 2024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 2024 to the system bus 2018, a removable or non-removable interface is typically used such as interface 2026.

It is to be appreciated that FIG. 20 describes software that acts as an intermediary between users and the basic computer resources described in suitable operating environment 2010. Such software includes an operating system 2028. Operating system 2028, which can be stored on disk storage 2024, acts to control and allocate resources of the computer 2012. System applications 2030 take advantage of the management of resources by operating system 2028 through program modules 2032 and program data 2034 stored either in system memory 2016 or on disk storage 2024. It is to be appreciated that one or more embodiments of the subject disclosure can be implemented with various operating systems or combinations of operating systems.

A user enters commands or information into the computer 2012 through input device(s) 2036. Input devices 2036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 2014 through the system bus 2018 via interface port(s) 2038. Interface port(s) 2038 include, for example, a serial port, a parallel port, a game port, and a universal serial bus (USB). Output device(s) 2040 use some of the same type of ports as input device(s) 2036. Thus, for example, a USB port may be used to provide input to computer 2012, and to output information from computer 2012 to an output device 2040. Output adapters 2042 are provided to illustrate that there are some output devices 2040 like monitors, speakers, and printers, among other output devices 2040, which require special adapters. The output adapters 2042 include, by way of illustration and not limitation, video and sound cards that provide a means of connection between the output device 2040 and the system bus 2018. It should be noted that other devices and/or systems of devices provide both input and output capabilities such as remote computer(s) 2044.

Computer 2012 can operate in a networked environment using logical connections to one or more remote computers, such as remote computer(s) 2044. The remote computer(s) 2044 can be a personal computer, a server, a router, a network PC, a workstation, a microprocessor based appliance, a peer device or other common network node and the like, and typically includes many or all of the elements described relative to computer 2012. For purposes of brevity, only a memory storage device 2046 is illustrated with remote computer(s) 2044. Remote computer(s) 2044 is logically connected to computer 2012 through a network interface 2048 and then physically connected via communication connection 2050. Network interface 2048 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 2050 refers to the hardware/software employed to connect the network interface 2048 to the system bus 2018. While communication connection 2050 is shown for illustrative clarity inside computer 2012, it can also be external to computer 2012. The hardware/software necessary for connection to the network interface 2048 includes, for exemplary purposes only, internal and external technologies such as, modems including regular telephone grade modems, cable modems and DSL modems, ISDN adapters, and Ethernet cards.

FIG. 21 is a schematic block diagram of a sample computing environment 2100 with which the disclosed subject matter can interact. The sample computing environment 2100 includes one or more client(s) 2102. The client(s) 2102 can be hardware and/or software (e.g., threads, processes, computing devices). The sample computing environment 2100 also includes one or more server(s) 2104. The server(s) 2104 can also be hardware and/or software (e.g., threads, processes, computing devices). The servers 2104 can house threads to perform transformations by employing one or more embodiments as described herein, for example. One possible communication between a client 2102 and servers 2104 can be in the form of a data packet adapted to be transmitted between two or more computer processes. The sample computing environment 2100 includes a communication framework 2106 that can be employed to facilitate communications between the client(s) 2102 and the server(s) 2104. The client(s) 2102 are operably connected to one or more client data store(s) 2108 that can be employed to store information local to the client(s) 2102. Similarly, the server(s) 2104 are operably connected to one or more server data store(s) 2110 that can be employed to store information local to the servers 2104.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. An imaging device, comprising:
   a memory that stores executable components; and
   a processor, operatively coupled to the memory, that executes the executable components, the executable components comprising:
   an illumination component configured to emit a light pulse toward a viewing field;
   a photo-receiver configured to generate an electrical output proportional to an intensity of light incident on a surface of the photo-receiver;
   a pixel array component configured to generate waveform data corresponding to a reflected light pulse received by the photo-receiver based on the electrical output;
   a waveform analysis component configured to perform a comparison of a change in a shape of the reflected light pulse indicated by the waveform data over time with signature profile data that defines expected waveform change patterns, as functions of time, corresponding to respective object classifications, and generate classification data assigning an object classification, of the object classifications, to an object corresponding to the reflected light pulse based on a result of the comparison; and a hazard analysis and decision component configured to generate an output signal based on the object classification.

2. The imaging device of claim 1, wherein the object classification is at least one of snow, aerosol, water, fog, or mist.

3. The imaging device of claim 1, further comprising a distance determination component configured to generate distance information corresponding to a pixel of the photo-receiver based on analysis of the waveform data.

4. The imaging device of claim 3, wherein the hazard analysis and decision component is configured to generate the output signal further based on the distance information.

5. The imaging device of claim 3, wherein
the hazard analysis and decision component is configured to generate the output signal in response to a determination that the object classification and the distance satisfy defined criteria, and
the output signal comprises a control signal configured to instruct a controller to cause a controlled industrial process to enter a safe state.

6. The imaging device of claim 3, wherein the distance determination component is further configured to
measure, at a first time, an amount of light received by the photo-receiver attributable to mist within a zone of limited detection of the imaging device,
record the amount of light as a baseline, and
generate, at a second time subsequent to the first time, other distance information corresponding to the pixel of the photo-receiver for another object within the zone of limited detection based the waveform data and the baseline.

7. The imaging device of claim 1, further comprising:
a spot pattern component configured to instruct the illumination component to emit an array of light beams according to a defined pattern; and
a pattern analysis component configured to:
identify pixels of the photo-receiver corresponding to spots representing reflected light from the array of focused light beams,
identify a received pattern of light spots based on the pixels corresponding to the spots, and
compare the received pattern with the defined pattern,
wherein the hazard analysis and decision component is further configured to, in response to determining that the received pattern deviates from the defined pattern in excess of a defined threshold, output another output signal.

8. The imaging device of claim 7, wherein
the other output signal comprises a message directed to a client device, the message indicating a fault of the imaging device.

9. A method, comprising:
emitting, by a time-of-flight (TOF) sensor device comprising a processor, a light pulse into a viewing space;
generating, by the TOF sensor device, an electrical output in proportion to an intensity of light incident on a surface of a photo-receiver of the TOF sensor device;
generating, by the TOF sensor device, waveform data representing a reflected light pulse received by the photo-receiver based on the electrical output;
comparing, by the TOF sensor device, a change in a shape of the reflected light pulse represented by the waveform data over time with stored waveform profiles that define expected waveform change patterns, as functions of time, for respective object classifications;
generating, by the TOF sensor device based on a result of the comparing, classification data that indicates an object classification, of the respective object classifications, assigned to an object corresponding to the reflected light pulse; and
in response to determining that the object classification satisfies a criterion, generating, by the TOF sensor device, an output signal based on the object classification.

10. The method of claim 9, wherein the generating the classification data comprises generating the classification data to indicate, as the object classification, one or more of snow, aerosol, water, fog, or mist.

11. The method of claim 9, further comprising generating, by the TOF sensor device, distance data for the object based on analysis of the waveform data.

12. The method of claim 11, wherein the generating the output signal comprises generating the output signal further based on the distance data.

13. The method of claim 11, wherein the generating the output signal comprises generating a control signal configured to transition a controlled industrial process to a safe mode in response to determining that the object classification and the distance data satisfy defined criteria.

14. The method of claim 9, further comprising:
emitting, by the TOF sensor device, multiple light beams directed in a defined pattern;
identifying, by the TOF sensor device, pixels of the photo-receiver corresponding to spots representing light reflected from the multiple light beams;
identifying, by the TOF sensor device, a received pattern of light spots based on the pixels corresponding to the spots;
comparing, by the TOF sensor device, the received pattern of light spots with the defined pattern; and
in response to determining that the received pattern deviates from the defined pattern in excess of a defined threshold, generating, by the TOF sensor device, another output signal.

15. The method of claim 14, wherein the generating the other output signal comprises generating message data indicating a fault in the TOF sensor device.

16. The method of claim 11, further comprising:
measuring, by the TOF sensor device at a first time, an amount of light received by the photo-receiver due to mist within a zone of limited detection of the TOF sensor device,
recording, by the TOF sensor device, the amount of light as a baseline, and
generating, by the TOF sensor device at a second time subsequent to the first time, other distance data for an object within the zone of limited detection based the waveform data and the baseline.

17. A non-transitory computer-readable medium having stored thereon instructions that, in response to execution, cause a time-of-flight (TOF) sensor device comprising a processor to perform operations, the operations comprising:
emitting a light pulse into a viewing area;
generating an electrical output proportional to an intensity of light incident on a surface of a photo-receiver of the TOF sensor device;
generating, based on the electrical output, waveform data corresponding to a reflected light pulse received by the photo-receiver;
comparing a change in a waveform shape indicated by the waveform data over time with waveform profile data that defines expected waveform change patterns, as functions of time, corresponding to respective object classifications;

generating based on a result of the comparing, classification data that identifies an object classification, of the respective object classifications, assigned to an object corresponding to the reflected light pulse; and in response to determining that the object classification satisfies a criterion, generating an output signal based on the object classification.

18. The non-transitory computer-readable medium of claim 17, wherein the generating the classification data comprises generating the classification data to indicate, as the object classification, one or more of snow, aerosol, water, fog, or mist.

19. The non-transitory computer-readable medium of claim 17, the operations further comprising generating distance data for the object based on analysis of the waveform data.

20. The non-transitory computer-readable medium of claim 19, wherein the generating the output signal comprises generating the output signal further based on the distance data.

\* \* \* \* \*